(12) United States Patent
Lucas et al.

(10) Patent No.: US 9,665,451 B2
(45) Date of Patent: May 30, 2017

(54) METHOD AND DEVICE FOR DISTRIBUTING HOLDUP ENERGY TO MEMORY ARRAYS

(71) Applicant: SanDisk Enterprise IP LLC, Milpitas, CA (US)

(72) Inventors: Gregg S. Lucas, Tuscon, AZ (US); Robert W. Ellis, Phoenix, AZ (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 142 days.

(21) Appl. No.: 14/599,150

(22) Filed: Jan. 16, 2015

(65) Prior Publication Data

US 2016/0098328 A1    Apr. 7, 2016

Related U.S. Application Data

(60) Provisional application No. 62/061,061, filed on Oct. 7, 2014.

(51) Int. Cl.
*G06F 11/00*    (2006.01)
*G06F 11/20*    (2006.01)
(Continued)

(52) U.S. Cl.
CPC ............ *G06F 11/2015* (2013.01); *G06F 1/26* (2013.01); *G06F 3/0604* (2013.01);
(Continued)

(58) Field of Classification Search
CPC ............... G06F 11/073; G06F 11/1441; G06F 11/1446; G06F 11/2015; G06F 11/3037;
(Continued)

(56) References Cited

U.S. PATENT DOCUMENTS 4,322,766 A    3/1982 Becker et al.
4,528,458 A    7/1985 Nelson et al.
(Continued)

FOREIGN PATENT DOCUMENTS

EP    1 956 489 A2    8/2008

OTHER PUBLICATIONS

IBM Corporation, "Systems Management, Work Management," Version 5, Release 4, 9th Edition, Feb. 2006, pp. 1-21.
(Continued)

*Primary Examiner* — Marc Duncan
(74) *Attorney, Agent, or Firm* — Morgan, Lewis & Bockius LLP

(57) ABSTRACT

The various embodiments described herein include methods and/or devices used to protect data in a storage device. In one aspect, a method includes performing a power fail operation on a first section of the storage device, the first section of the storage device comprising one or more memory group modules. The power fail operation includes supplying power, via one or more energy storage devices, to the one or more memory group modules, where each memory group module includes a respective memory group module controller. The power fail operation also includes supplying power, via an additional energy storage device, to a storage device controller, the storage device controller corresponding to the first section of the storage device. The additional energy storage device is distinct from the one or more energy storage devices and each are distinct from a power source used during normal operation of the storage device.

24 Claims, 16 Drawing Sheets

(51) Int. Cl.
*G06F 3/06* (2006.01)
*G06F 1/26* (2006.01)
*G06F 11/14* (2006.01)
*G06F 11/30* (2006.01)

(52) U.S. Cl.
CPC .......... *G06F 3/0659* (2013.01); *G06F 3/0673* (2013.01); *G06F 11/1441* (2013.01); *G06F 11/3037* (2013.01); *G06F 11/3058* (2013.01); *G06F 2201/81* (2013.01)

(58) Field of Classification Search
CPC ........ G06F 11/3058; G06F 1/26; G06F 1/263; G06F 1/28; G06F 1/30; G06F 3/0604; G06F 3/0659; G06F 3/0673; G06F 2201/81
See application file for complete search history.

(56) References Cited

U.S. PATENT DOCUMENTS

| | | | |
|---|---|---|---|
| 4,600,962 A | 7/1986 | Bliehall | |
| 5,193,176 A | 3/1993 | Brandin | |
| 5,568,429 A | 10/1996 | D'Souza et al. | |
| 5,832,515 A | 11/1998 | Ledain et al. | |
| 5,996,054 A | 11/1999 | Ledain et al. | |
| 6,393,584 B1 | 5/2002 | McLaren et al. | |
| 6,597,073 B1 | 7/2003 | Check | |
| 6,678,788 B1 | 1/2004 | O'Connell | |
| 6,738,268 B1 | 5/2004 | Sullivan et al. | |
| 7,269,755 B2* | 9/2007 | Moshayedi | G06F 11/1441 714/2 |
| 7,870,338 B2 | 1/2011 | Iida et al. | |
| 8,001,419 B2 | 8/2011 | Killian et al. | |
| 8,468,370 B2* | 6/2013 | Miller | G06F 1/30 320/127 |
| 8,527,693 B2* | 9/2013 | Flynn | G06F 11/1008 711/103 |
| 8,719,629 B2* | 5/2014 | Wilson | G06F 11/2015 714/14 |
| 8,924,661 B1* | 12/2014 | Shachar | G06F 13/1668 365/189.2 |
| 9,298,252 B2* | 3/2016 | Ellis | G06F 1/3268 |
| 2003/0074592 A1 | 4/2003 | Hasegawa | |
| 2003/0126494 A1 | 7/2003 | Strasser | |
| 2004/0252670 A1 | 12/2004 | Rong et al. | |
| 2005/0114587 A1 | 5/2005 | Chou et al. | |
| 2005/0134288 A1 | 6/2005 | Monter et al. | |
| 2005/0223206 A1 | 10/2005 | Janzen et al. | |
| 2006/0039196 A1 | 2/2006 | Gorobets et al. | |
| 2006/0108875 A1 | 5/2006 | Grundmann et al. | |
| 2007/0083779 A1 | 4/2007 | Misaka et al. | |
| 2007/0180188 A1 | 8/2007 | Fujibayashi et al. | |
| 2009/0168525 A1 | 7/2009 | Olbrich et al. | |
| 2010/0008175 A1 | 1/2010 | Sweere et al. | |
| 2010/0011261 A1* | 1/2010 | Cagno | G06F 11/1064 714/719 |
| 2010/0052426 A1 | 3/2010 | Carter et al. | |
| 2010/0052625 A1 | 3/2010 | Cagno et al. | |
| 2010/0095048 A1 | 4/2010 | Bechtolsheim et al. | |
| 2010/0103737 A1 | 4/2010 | Park | |
| 2010/0217920 A1 | 8/2010 | Song | |
| 2010/0306449 A1* | 12/2010 | Berke | G06F 11/1441 711/103 |
| 2010/0332862 A1* | 12/2010 | Lester | G06F 1/30 713/300 |
| 2011/0066872 A1 | 3/2011 | Miller et al. | |
| 2011/0085657 A1 | 4/2011 | Matthews, Jr. | |
| 2012/0054456 A1 | 3/2012 | Grube et al. | |
| 2012/0084492 A1 | 4/2012 | Stenfort | |
| 2012/0089855 A1 | 4/2012 | Beckhoff et al. | |
| 2012/0221801 A1 | 8/2012 | Okawa | |
| 2012/0271990 A1 | 10/2012 | Chen et al. | |
| 2013/0019076 A1 | 1/2013 | Amidi et al. | |
| 2013/0336081 A1 | 12/2013 | Sheets et al. | |
| 2014/0001861 A1 | 1/2014 | Mann et al. | |
| 2014/0006798 A1 | 1/2014 | Prakash et al. | |
| 2014/0008970 A1 | 1/2014 | Yamaguchi | |
| 2014/0012522 A1 | 1/2014 | Colombi et al. | |
| 2014/0195564 A1* | 7/2014 | Talagala | G06F 12/0804 707/802 |
| 2014/0215103 A1 | 7/2014 | Cohen et al. | |
| 2014/0258755 A1* | 9/2014 | Stenfort | G06F 1/30 713/323 |
| 2014/0269053 A1 | 9/2014 | Chen et al. | |
| 2015/0052397 A1 | 2/2015 | Nakamura et al. | |
| 2015/0378415 A1* | 12/2015 | George | G06F 1/30 307/64 |
| 2016/0018999 A1* | 1/2016 | Stenfort | G06F 3/0607 711/154 |

OTHER PUBLICATIONS

Texas Instruments, "Power Management IC for Digital Set Top Boxes," SLVSA10A, Sep. 2009, pp. 1-22.
International Search Report and Written Opinion dated Jan. 26, 2015, received in International Patent Application No. PCT/US2014/059118, which corresponds to U.S. Appl. No. 14/135,371, 11 pages (Lucas).
International Search Report and Written Opinion dated May 27, 2015, received in International Patent Application No. PCT/US2014/067476, which corresponds to U.S. Appl. No. 14/135,417, 14 pages (Lucas).
International Search Report and Written Opinion dated Jul. 26, 2013, received in International Patent Application No. PCT/US2013/035162, which corresponds to U.S. Appl. No. 13/855,567, 7 pages (Ellis).
International Preliminary Report on Patentability dated Oct. 30, 2014, received in International Patent Application No. PCT/US2013/035162, which corresponds to U.S. Appl. No. 13/855,567, 4 pages (Ellis).
International Search Report and Written Opinion dated Jul. 14, 2015, received in International Patent Application No. PCT/US2015/027263, which corresponds to U.S. Appl. No. 14/599,128, 10 pages (Ellis).

* cited by examiner

```
┌─────────────────────────────────────────────────────────────────────┐
│ Perform a power fail operation on a first section of the storage    │─ 906
│ device, the first section of the storage device comprising one or   │
│ more memory group modules, and the power fail operation including:  │
│                              (A)                                     │
│  ┌───────────────────────────────────────────────────────────────┐  │
│  │ Supplying power, via an additional energy storage device, to  │──916
│  │ a storage device controller, the storage device controller    │  │
│  │ corresponding to the first section of the storage device      │  │
│  │  ┌─────────────────────────────────────────────────────────┐  │  │
│  │  │ The additional energy storage device is distinct from   │──918
│  │  │ the one or more energy storage devices                  │  │  │
│  │  └─────────────────────────────────────────────────────────┘  │  │
│  │  ┌─────────────────────────────────────────────────────────┐  │  │
│  │  │ The one or more energy storage devices and the          │──920
│  │  │ additional energy storage device are each distinct from │  │  │
│  │  │ a power source used during normal operation of the      │  │  │
│  │  │ storage device                                          │  │  │
│  │  └─────────────────────────────────────────────────────────┘  │  │
│  └───────────────────────────────────────────────────────────────┘  │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐  │
│    The one or more memory group modules include at least first      │──922
│  │ and second memory group modules, and the one or more energy   │  │
│    storage devices include at least first and second energy         │
│  │ storage devices                                               │  │
│    ┌ ─ ─ ─ ─ ─ ─ ─ ─ ─ ─ ─ ─ ─ ─ ─ ─ ─ ─ ─ ─ ─ ─ ─ ─ ─ ─ ─ ─ ┐    │
│  │   Supplying power, via the one or more energy storage       │  │──924
│      devices, to the one or more memory group modules comprises:   │
│  │ │                                                           │ │  │
│      utilizing the first energy storage device to supply power to
│  │ │ the first memory group module, and not utilizing the first│ │  │
│      energy storage device to supply power to the second memory
│  │ │ group module; and                                         │ │  │
│  │ │                                                           │ │  │
│        utilizing the second energy storage device to supply
│  │ │ power to the second memory group module, and not utilizing│ │  │
│        the second energy storage device to supply power to the
│  │ │ first memory group module.                                │ │  │
│    └ ─ ─ ─ ─ ─ ─ ─ ─ ─ ─ ─ ─ ─ ─ ─ ─ ─ ─ ─ ─ ─ ─ ─ ─ ─ ─ ─ ─ ┘    │
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘  │
│                              (B)                                     │
└─────────────────────────────────────────────────────────────────────┘
```

Figure 9B

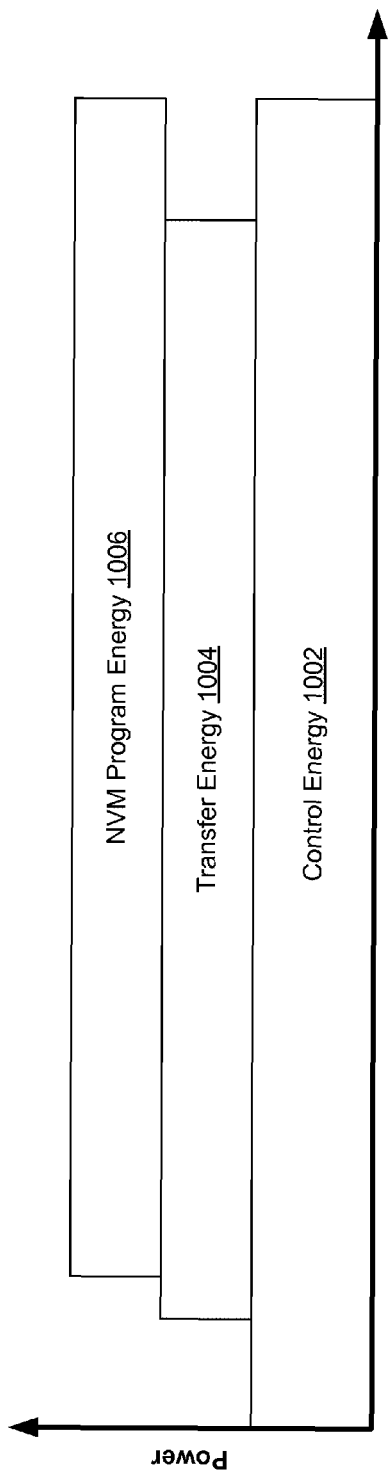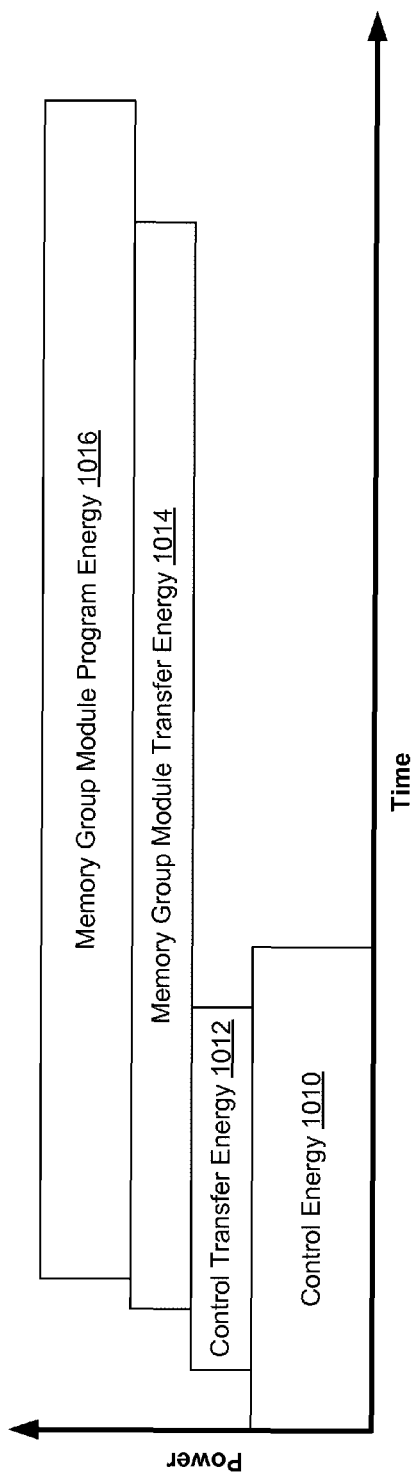

METHOD AND DEVICE FOR DISTRIBUTING HOLDUP ENERGY TO MEMORY ARRAYS

RELATED APPLICATIONS

This application claims priority to U.S. Provisional Application No. 62/061,061, filed Oct. 7, 2014, which is hereby incorporated by reference in its entirety.

TECHNICAL FIELD

The disclosed embodiments relate generally to data storage systems, and in particular, to power management and data hardening architecture in storage devices (e.g., solid-state drives).

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information.

Data hardening, the saving of data and mission critical metadata held in volatile storage, is an integral part of a storage device. When there is a power failure, mission critical data may reside in volatile memory in a number of sub-system components. Coordinating and managing multiple sub-system components to ensure that volatile data is saved successfully is important for safeguarding data integrity of a storage device. Storage devices with data hardening functionality sometimes use energy storage devices (e.g., holdup capacitor banks) to store energy for later use, if and when input power is lost. In these devices, power management is important to manage power demands on the host system during power failure conditions.

SUMMARY

Various embodiments of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various embodiments are used to enable power management and data hardening in storage devices (e.g., solid-state drives, sometimes called SSD's). In one aspect, a device includes one or more memory group modules, each memory group module including a respective memory controller and non-volatile memory. The device also includes a storage device controller coupled to the one or more memory group modules, the storage device controller configured to control a plurality of data transfer operations. The device further includes one or more energy storage devices, where each of the one or more energy storage devices is coupled to a respective memory group module, and is configured to supply power to the respective memory group module during a power fail operation without supplying power to the storage device controller during the power fail operation.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIGS. 9A-9F illustrate a flowchart representation of a method of power management in a storage device, in accordance with some embodiments.

FIG. 10A is a diagram illustrating power usage of a non-distributed holdup device during a power fail operation.

FIG. 10B is a diagram illustrating power usage of a distributed holdup device during a power fail operation.

Figure 1A:
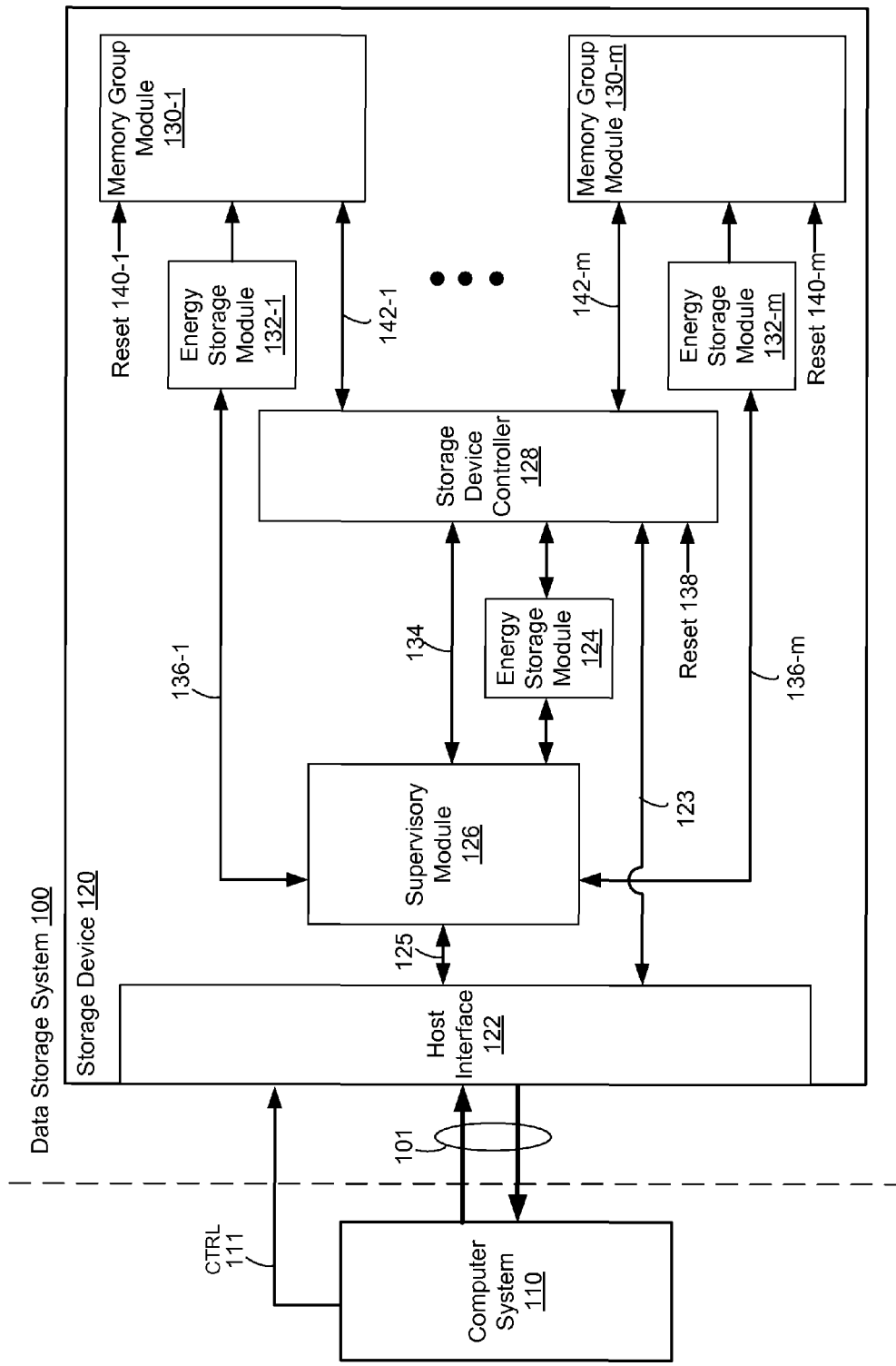
FIG. 1A is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various embodiments described herein include methods and/or devices used for power management and data hardening in storage devices. Some embodiments include methods and/or devices to perform a power fail operation.

(A1) In one aspect, some embodiments include a storage device. In some embodiments, the storage device includes an interface for coupling the storage device to a host system. The storage device also includes one or more memory group modules (e.g., one or more memory group modules), each memory group module of the one or more memory group modules including a respective memory controller and non-volatile memory, where each respective memory controller is configured to control a plurality of operations within a corresponding memory group module. The storage device further includes a storage device controller coupled to the one or more memory group modules, the storage device controller configured to control a plurality of data transfer operations. The storage device further includes one or more energy storage devices, each of the one or more energy storage devices for supplying power to one or more corresponding memory group modules during a power fail operation. In addition, the storage device is configured to couple each energy storage device of the one or more energy storage devices to one or more corresponding memory group modules without coupling the energy storage device to the storage device controller during the power fail operation. For example, in some embodiments, a respective memory controller is configured to do the following tasks during a power fail operation: (1) read data from non-volatile memory into volatile memory associated with a memory group module; (2) write data received from an external source into the volatile memory associated with the memory group module; (3) program data stored in the volatile memory into the non-volatile memory. For example, in some embodiments, the one or more energy storage devices supply power to a first portion of the storage device during a power fail operation. In some embodiments, none of the energy storage devices that provide power to the memory group module, or the first portion of the storage device, during a power fail operation are coupled to the storage device controller and do not provide power to the storage device controller during the power fail operation.

(A2) In some embodiments of the device of A1, at least one memory group module of the one or more memory group modules is configured to harden data during the power fail operation. In some embodiments, each respective memory controller is further configured to harden data during a power fail operation.

(A3) In some embodiments of the device of A2, the storage device includes volatile memory corresponding to each memory group module of the one or more memory group modules; and hardening data includes, for a respective memory group module, transferring data to the non-volatile memory within the respective memory group module from the corresponding volatile memory. In some embodiments, the volatile memory is a buffer. In some embodiments, the volatile memory includes a component (e.g., a DRAM or SRAM component) within each respective memory group module. In some embodiments, the data is transferred to one or more predetermined pages within the non-volatile memory. In some embodiments, the non-volatile memory includes a plurality of fast pages and a plurality of slow pages and the one or more predetermined pages include a subset of the plurality of fast pages (e.g., pages corresponding to single-level cells (SLC's) in one or more flash memory die).

(A4) In some embodiments of the device of any of A2-A3, the at least one memory group module is further configured to reset subsequent to hardening the data. For example, in some embodiments, the storage device is configured to set each memory group module to a known state and affirmatively remove power from (as opposed to allowing the module to automatically lose power) each memory group module. In some embodiments, each memory group module of the one or more memory group modules resets independently of any other memory group module. In some embodiments, each memory group module of the one or more memory group modules resets after the storage device controller is reset.

(A5) In some embodiments of the device of any of A1-A4, each memory group module of the one or more memory group modules is configured to disregard signals received from the storage device controller during the power fail operation. For example, in some embodiments, each memory group module is configured to ignore erroneous outputs (glitches) generated by the storage device controller during the process of powering down or after powering down.

(A6) In some embodiments of the device of any of A1-A5, the one or more memory group modules include at least first and second memory group modules, the one or more energy storage devices include at least first and second energy storage devices, and the storage device is configured to couple the first energy storage device to the first memory group module but not the second memory group module, and is further configured to couple the second energy storage device to the second memory group module but not the first memory group module.

(A7) In some embodiments of the device of any of A1-A5, the one or more energy storage devices consist of a first energy storage device, and the one or more memory group modules include a plurality of memory group modules; and the first energy storage device is coupled to each memory group module of the plurality of memory group modules.

(A8) In some embodiments of the device of any of A1-A5, the one or more memory group modules include a plurality of memory group modules; and a first subset of the plurality of memory group modules are not coupled to the one or more energy storage devices.

(A9) In some embodiments of the device of A8, the storage device is configured to prevent the storage of critical data in memory corresponding to the first subset of the plurality of memory group modules.

(A10) In some embodiments of the device of any of A1-A9, the storage device controller is configured to: (1) receive data from the host system to be written to non-volatile memory (e.g., via the interface); (2) transfer the data to at least one memory group module of the one or more memory group modules; and (3) after transferring the data to the at least one memory group module, send an acknowledgement signal to the host, where the acknowledgement signal indicates to the host system that the data has been stored in non-volatile memory.

(A11) In some embodiments of the device of any of A1-A10, the storage device further includes an additional energy storage device coupled to the storage device controller, the additional energy storage device configured to supply power to the storage device controller during the power fail operation.

(A12) In some embodiments of the device of any of A1-A11, the storage device is configured to reset the storage device controller during the power fail operation.

(A13) In some embodiments of the device of A12, the storage device further includes volatile memory associated with the storage device controller; and the storage device is further configured to transfer data from the volatile memory associated with the storage device controller to at least one memory group module of the one or more memory group modules prior to resetting the storage device controller.

(A14) In some embodiments of the device of A12, the storage device further includes volatile memory associated with the storage device controller; data is stored in the volatile memory associated with the storage device controller; and the storage device is further configured to reset the storage device controller regardless of the data stored in the volatile memory associated with the storage device controller.

(A15) In some embodiments of the device of A14, (1) the data stored in the volatile memory associated with the storage device controller includes metadata corresponding to a mapping of non-volatile memory in the one or more memory group modules (e.g., a logical to physical mapping or a mapping of known-bad sectors); and (2) the storage device is further configured to reconstruct the metadata corresponding to the mapping of non-volatile memory in the one or more memory group modules from metadata stored in non-volatile memory of at least one memory group module of the one or more memory group modules subsequent to the power fail operation. For example, in some embodiments, the storage device is configured to reconstruct the metadata during a start-up operation subsequent to the power fail operation.

(A16) In some embodiments of the device of any of A1-A15, the storage device is configured to: (1) determine whether a power supply voltage provided to the storage device meets predetermined power fail criteria; and (2) in accordance with a determination that the power supply voltage meets the predetermined power fail criteria, perform the power fail operation.

(A17) In some embodiments of the device of any of A1-A16, each energy storage device of the one or more energy storage devices includes one or more capacitors.

(A18) In some embodiments of the device of any of A1-A17, each energy storage device of the one or more energy storage devices is configured to supply power to a respective memory group module in response to a power fail signal, the power fail signal indicative of the start of the power fail operation.

(A19) In some embodiments of the device of any of A1-A18, the storage device further includes: (1) one or more boost regulators, each boost regulator of the one or more boost regulators configured to boost a respective input voltage and having an output coupled to at least one memory group module of the one or more memory group modules; and (2) one or more selectors, each selector of the one or more selectors configured to selectively couple a respective energy storage device to either an input or an output of a corresponding boost regulator; where (a) a respective selector is configured to couple a respective energy storage device to the output of a corresponding boost regulator during normal operation of the storage device; and (b) the selector is further configured to couple the respective energy storage device to the input of the corresponding boost regulator during the power fail operation.

(A20) In some embodiments of the device of any of A1-A19, the storage device further includes a regulator module coupled to the interface, and the regulator module includes one or more regulators for supplying power to a first portion of the storage device; where the first portion includes at least the one or more memory group modules; and where each of the one or more energy storage devices is further coupled to a respective output of the regulator module.

(A21) In some embodiments of the device of A20, each energy storage device of the one or more energy storage devices is further configured to buffer power spikes (e.g., bulk decoupling) in power received from the respective output of the regulator module.

(A22) In some embodiments of the device of any of A20-A21, the storage device is further configured to decouple the regulator module from at least one energy storage device of the one or more energy storage devices during the power fail operation. For example, in some embodiments, the storage device is further configured to decouple the regulator module via a power fail signal. In some embodiments, the storage device further includes a switch (e.g., a PFET) and the switch decouples the regulator module.

(A23) In some embodiments of the device of any of A20-A22, the storage device further includes: (1) a first memory group module of the one or more memory group modules coupled to a plurality of regulator module outputs, where each output of the plurality of regulator module outputs corresponds to a particular voltage; and (2) a first respective energy storage device coupled to the first memory group module and a first output of the plurality of the regulator module outputs; where (a) the regulator module is configured to supply power corresponding to a first voltage via the first output of the plurality of the regulator module outputs during normal operation; (b) the storage device is configured to decouple the plurality of regulator module outputs from the first memory group module during the power fail operation; and (c) the first respective energy storage device is configured to supply power corresponding to the first voltage to the first memory group module during the power fail operation.

(A24) In some embodiments of the device of any of A1-A23, a first memory group module of the one or more memory group modules is configured to prevent corruption of previously committed data by committing data stored in volatile memory corresponding to a particular memory group module of the one or more memory group modules during the power fail operation, regardless of errors in the data.

(A25) In one aspect, some embodiments include a method of power management. In some embodiments, a method of power management in a storage device includes performing a power fail operation on a first section of the storage device, the first section of the storage device including one or more memory group modules. The power fail operation includes: (1) supplying power, via one or more energy storage devices, to the one or more memory group modules, wherein each memory group module of the one or more memory group modules includes a respective memory group module controller; and (2) supplying power, via an additional energy storage device, to a storage device controller, the storage device controller corresponding to the first section of the storage device; where (a) the additional energy storage device is distinct from the one or more energy storage devices; and (b) the one or more energy storage devices and the additional energy storage device are each distinct from a power source used during normal operation of the storage device.

(A26) In some embodiments of the method of A25, the power fail operation further includes hardening data.

(A27) In some embodiments of the method of A26, hardening data includes, for a respective memory group module, transferring data from volatile memory to non-volatile memory within the respective memory group module.

(A28) In some embodiments of the method of any of A26-A27, the power fail operation further includes, for each memory group module of the one or more memory group modules, subsequent to hardening the data, resetting the respective memory group module controller.

(A29) In some embodiments of the method of any of A25-A28, the method further includes disregarding one or more signals sent from the storage device controller to the one or more memory group modules during the power fail operation.

(A30) In some embodiments of the method of any of A25-A29, (1) the one or more memory group modules include at least first and second memory group modules, and the one or more energy storage devices include at least first and second energy storage devices; and (2) supplying power, via the one or more energy storage devices, to the one or more memory group modules includes: (a) utilizing the first energy storage device to supply power to the first memory group module, and not utilizing the first energy storage device to supply power to the second memory group module; and (b) utilizing the second energy storage device to supply power to the second memory group module, and not utilizing the second energy storage device to supply power to the first memory group module.

(A31) In some embodiments of the method of any of A25-A29, (1) the one or more energy storage devices consist of a first energy storage device, and the one or more memory group modules include a plurality of memory group modules; and (2) supplying power, via the one or more energy storage devices, to the one or more memory group modules includes supplying power, via the first energy storage device, to the plurality of memory group modules.

(A32) In some embodiments of the method of any of A25-A29, (1) the one or more memory group modules include at least a first memory group module and a second memory group module; and (2) supplying power, via the one or more energy storage devices, to the one or more memory group modules includes supplying power to the first memory group module and not supplying power to the second memory group module.

(A33) In some embodiments of the method of A32, the method further includes preventing the storage of critical data in memory corresponding to the second memory group module.

(A34) In some embodiments of the method of any of A25-A33, the method further includes: (1) receiving data from the host system to be written to non-volatile memory; (2) transferring the data to at least one memory group module of the one or more memory group modules; and, (3) after transferring the data to the at least one memory group module, sending an acknowledgement signal to the host, where the acknowledgement signal indicates to the host system that the data has been stored in non-volatile memory.

(A35) In some embodiments of the method of any of A25-A34, the power fail operation further includes resetting the storage device controller.

(A36) In some embodiments of the method of A35, the method further includes, prior to resetting the storage device controller, transferring data from volatile memory associated with the storage device controller to at least one memory group module of the one or more memory group modules.

(A37) In some embodiments of the method of A35, resetting the storage device controller includes resetting the storage device controller regardless of whether data is stored in volatile memory associated with the storage device controller.

(A38) In some embodiments of the method of A37, (1) data is stored in the volatile memory associated with the storage device controller and the data includes metadata corresponding to a mapping of non-volatile memory in the one or more memory group modules; and (2) the method further includes, subsequent to the power fail operation, reconstructing the metadata corresponding to the mapping of non-volatile memory in the one or more memory group modules from metadata stored in respective non-volatile memory of at least one memory group module of the one or more memory group modules.

(A39) In some embodiments of the method of any of A25-A38, (1) the method further includes determining whether a power supply voltage provided to the storage device meets predetermined power fail criteria; and (2) performing the power fail operation on the first section of the storage device includes performing the power fail operation in accordance with a determination that the power supply voltage meets the predetermined power fail criteria.

(A40) In some embodiments of the method of any of A25-A39, each energy storage device of the one or more energy storage devices includes one or more capacitors.

(A41) In some embodiments of the method of any of A25-A40, supplying power, via the one or more energy storage devices, to the one or more memory group modules includes supplying power, via the one or more energy storage devices, to the one or more memory group modules in response to a power fail signal, the power fail signal indicative of the start of the power fail operation.

(A42) In some embodiments of the method of any of A25-A41, supplying power, via the one or more energy storage devices, to the one or more memory group modules includes, for each energy storage device of the one or more energy storage devices, switching the output of the respective energy storage device from an output of a boost regulator to an input of the boost regulator.

(A43) In some embodiments of the method of any of A25-A42, the method further includes, during normal operation, supplying power, via a regulator module, to the one or more memory group modules.

(A44) In some embodiments of the method of A43, the method further includes utilizing the one or more energy storage devices to buffer power spikes in power received from the regulator module.

(A45) In some embodiments of the method of any of A43-A44, the power fail operation further includes ceasing to supply power, via the regulator module, to the one or more memory group modules.

(A46) In some embodiments of the method of any of A43-A45, (1) supplying power, via the regulator module, to the one or more memory group modules includes supplying power corresponding to a plurality of voltages, including a first voltage, to each memory group module of the one or more memory group modules; and (2) supplying power, via the one or more energy storage devices, to the one or more memory group modules includes supplying power corresponding to only the first voltage to each memory group module of the one or more memory group modules.

(A47) In some embodiments of the method of any of A25-A46, the power fail operation further includes preventing corruption of previously committed data by committing data stored in volatile memory corresponding to a particular memory group module of the one or more memory group modules, regardless of errors in the data.

In yet another aspect, the method of any of A25 to A47 is performed by a storage device including: (1) memory, (2) one or more processors coupled to the memory, and (3) one or more programs, stored in the memory and executed by the one or more processors, the one or more programs including instructions for performing any of the methods described herein.

In yet another aspect, some embodiments include a non-transitory computer readable storage medium, storing one or more programs for execution by one or more processors of a storage device, the one or more programs including instructions for performing the method of any of A25 to A47.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure pertinent aspects of the embodiments described herein.

FIG. 1A is a block diagram illustrating an implementation of data storage system 100, in accordance with some embodiments. While some example features are illustrated, various other features have not been illustrated for the sake of brevity and so as not to obscure pertinent aspects of the example embodiments disclosed herein. To that end, as a non-limiting example, data storage system 100 includes storage device 120 (also sometimes called a data storage device, or information storage device, or a memory device). Storage device 120 is used in conjunction with computer system 110. Storage device 120 includes host interface 122, supervisory module 126, storage device controller 128 (also sometimes called a storage controller or a memory controller), memory group modules 130 (e.g., memory group module 130-1 through 130-$m$), energy storage modules 132, and, optionally, energy storage module 124. Storage device 120 also includes one or more communication lines that interconnect and control communications between system components. As shown in FIG. 1A, host interface 122 is coupled to supervisory module 126 via communication line 125; supervisory module 126 is coupled to storage device controller 128 via communication line 134; supervisory module 126 is coupled to energy storage modules 132 via communication lines 136; and storage device controller 128 is coupled to memory group modules 130 via lines 142. In some embodiments, a particular communication line is a communication bus and optionally includes circuitry for implementing communications and/or other functions.

In some embodiments, storage device 120 includes a single memory group module 130 while in other embodiments storage device 120 includes a plurality of memory group modules 130. In some embodiments, storage device 120 includes a single energy storage module 132 while in other embodiments storage device 120 includes a plurality of energy storage modules 132.

In some embodiments, each memory group module 130 is coupled to storage device controller 128, a corresponding energy storage module 132, and, optionally, supervisory module 126. For example, as shown in FIG. 1A, memory group module 130-1 is coupled to energy storage module 132-1 and storage device controller 128. However, each energy storage module 132 is not coupled to storage device controller 128 during power fail operations and thus does not provide power to storage device controller 128 during power fail operations. In some embodiments, each memory group module 130 includes a non-volatile memory (NVM) controller such as a flash controller (also sometimes called a memory group module controller), non-volatile memory such as one or more flash memory devices, and, optionally, volatile memory (e.g., a buffer). In some embodiments, a particular memory group module (e.g., memory group module 130-1) includes a single NVM device while in other embodiments the memory group module includes a plurality of NVM devices. In some embodiments, the NVM devices include NAND-type flash memory and/or NOR-type flash memory. Further, in some embodiments, a particular memory group module (e.g., memory group module 130-1) controller is a solid-state drive (SSD) controller. However, one or more other types of storage media may be included in accordance with some embodiments. Furthermore, in some embodiments, each memory group module 130, or a particular memory group module 130-$x$, includes the components shown in FIG. 3 for memory group module 300.

In some embodiments, a particular NVM controller 302 (FIG. 3) includes one or more processing units (also sometimes called CPUs or processors or microprocessors or microcontrollers) configured to execute instructions in one or more programs. In some embodiments, the one or more processors are shared by one or more components within, and in some cases, beyond the function of the NVM controller. In some embodiments, each NVM controller is configured to receive (e.g., via reset module 710, FIG. 7) reset 140 from various components of storage device 120 (e.g., from supervisory module 126 and/or from storage device controller 128). In some embodiments, reset 140-1 and reset 140-$m$ are the same signal.

The NVM devices in a memory group module are coupled to the corresponding NVM controller through connections that typically convey commands in addition to data, and optionally convey metadata, error correction information and/or other information in addition to data values to be stored in the NVM devices and data values read from the NVM devices. For example, the NVM devices can be configured for enterprise storage suitable for applications such as cloud computing, or for caching data stored (or to be stored) in secondary storage, such as hard disk drives. Additionally and/or alternatively, the NVM devices (e.g., flash memory devices) can also be configured for relatively smaller-scale applications such as personal flash drives or hard-disk replacements for personal, laptop and tablet computers. Although flash memory devices and flash controllers are used as an example here, in some embodiments storage device 120 includes other non-volatile memory device(s) and corresponding non-volatile memory controller(s).

In some embodiments, storage device 120 includes supervisory module 126 and storage device controller 128. Storage device 120 may include various additional features that have not been illustrated for the sake of brevity and so as not to obscure pertinent features of the example embodiments disclosed herein, and a different arrangement of features may be possible.

In some embodiments, supervisory module 126 (also sometimes called a data hardening module) includes one or more processing units (also sometimes called CPUs or processors or microprocessors or microcontrollers) configured to execute instructions in one or more programs (e.g., in supervisory module 126). In some embodiments, the one or more processors are shared by one or more components within, and in some cases, beyond the function of supervisory module 126. Supervisory module 126 is coupled to host interface 122, storage device controller 128, energy storage modules 132, and, optionally, memory group modules 130 and energy storage module 124 in order to coordinate the operation of these components, including supervising and controlling functions such as power up, power down, data hardening, charging energy storage device(s), data logging, and other aspects of managing functions on storage device 120.

Computer system 110 is coupled to storage device 120 through data connections 101. In some embodiments computer system 110 includes storage device 120 as a component and/or sub-system. Computer system 110 may be any suitable computer device, such as a personal computer, a workstation, a computer server, or any other computing device. Computer system 110 is sometimes called a host or host system. In some embodiments, computer system 110 includes one or more processors, one or more types of memory, and optionally includes a display and/or other user interface components such as a keyboard, a touch screen display, a mouse, a track-pad, a digital camera and/or any number of supplemental devices to add functionality. Further, in some embodiments, computer system 110 sends one or more host commands (e.g., read commands and/or write commands) on control line 111 to storage device 120. In some embodiments, control line 111 is a bus connection. In some embodiments, host interface 122 provides an interface to computer system 110 through data connections 101 and/or control line 111. In some embodiments, computer system 110 is a server system, such as a server system in a data center, and does not have a display and other user interface components.

Storage device controller 128 is coupled to host interface 122, supervisory module 126, memory group modules 130, and, optionally, energy storage module 124. In some embodiments, during a write operation, storage device controller 128 receives data from computer system 110 through host interface 122; and during a read operation, storage device controller 128 sends data to computer system 110 through host interface 122. Further, host interface 122 provides additional data, signals, voltages, and/or other information needed for communication between storage device controller 128 and computer system 110. In some embodiments, storage device controller 128 and host interface 122 use a defined interface standard for communication, such as double data rate type three synchronous dynamic random access memory (DDR3) or serial advance technology attachment (SATA). In some other embodiments, the device interface used by storage device controller 128 to communicate with memory group modules 130 is SAS (serial attached SCSI), or other storage interface. In some embodiments, storage device controller 128 is configured to receive reset 138 from a particular component of storage device 120 (e.g., from supervisory module 126 and/or from host interface 122). In some embodiments, reset 138, reset 140-1, and reset 140-m are the same signal. In some embodiments, reset 138, reset 140-1, and reset 140-m are independent signals. In some embodiments, reset 138, reset 140-1, and reset 140-m are transmitted via the same communication bus. In some embodiments, reset 138, reset 140-1, and reset 140-m are controlled separately. In some embodiments, storage device controller 128 includes one or more processing units (also sometimes called CPUs or processors or microprocessors or microcontrollers) configured to execute instructions in one or more programs (e.g., in storage device controller 128). In some embodiments, the one or more processors are shared by one or more components within, and in some cases, beyond the function of storage device controller 128.

Figure 2:
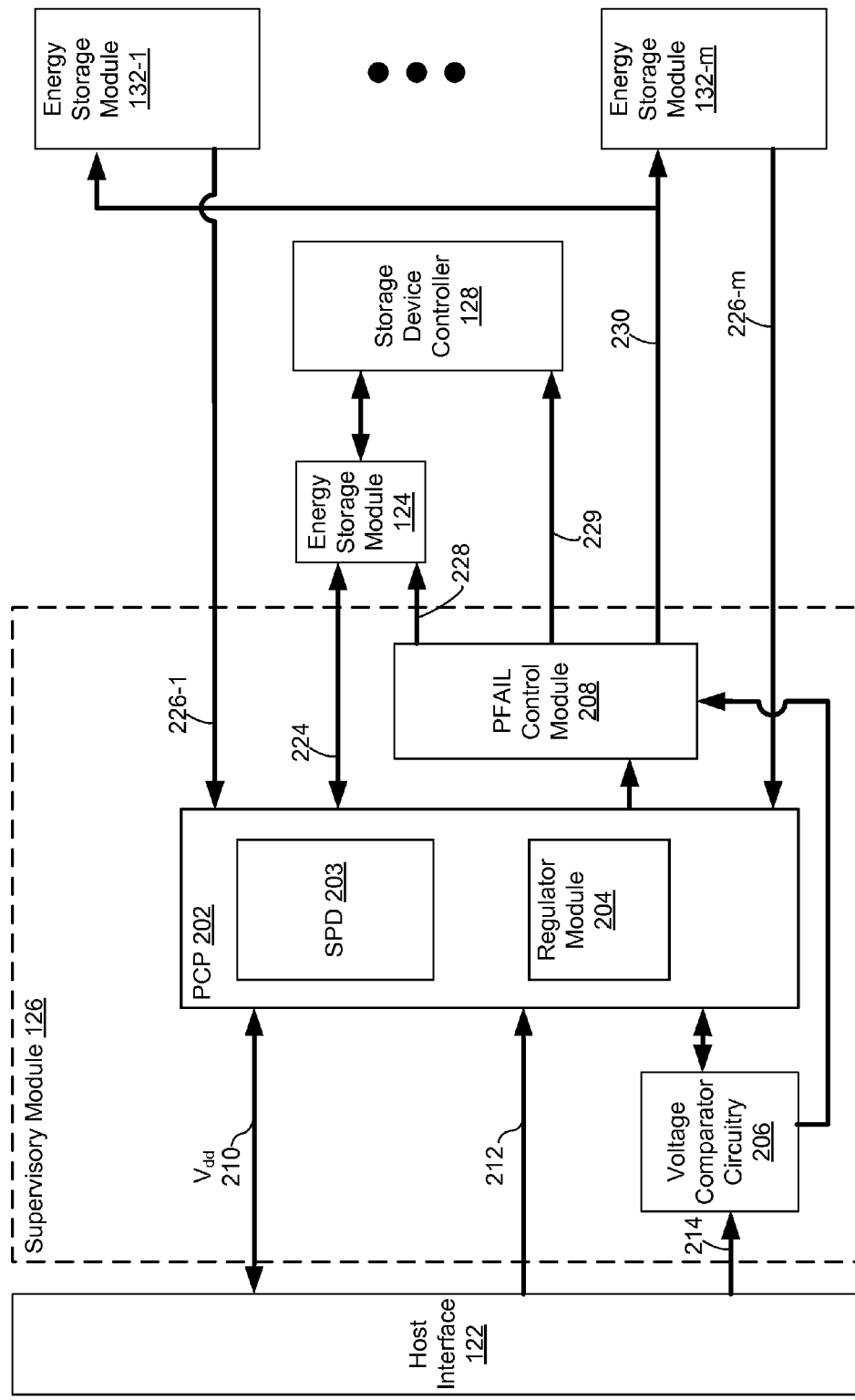
FIG. 2 is a block diagram illustrating an implementation of a supervisory module, in accordance with some embodiments.

In some embodiments, energy storage module 124 is coupled to supervisory module 126 and storage device controller 128. In some embodiments, energy storage module 124 includes one or more capacitors. In some embodiments, energy storage module 124 includes one or more inductors or other passive elements that store energy. In some embodiments, energy storage module 124 is charged by an output of supervisory module 126. In some embodiments, energy storage module 124 is charged by an output of regulator module 204 (FIG. 2).

Each energy storage module 132 is coupled to supervisory module 126 and at least one memory group module 130. For example, FIG. 1A shows energy storage module 132-1 coupled to supervisory module 126 and memory group module 130-1, but not to storage device controller 128. In some embodiments, each energy storage module 132 includes one or more capacitors. In some embodiments, each energy storage module 132 includes one or more inductors or other passive elements that store energy. In some embodiments, each energy storage module 132 is charged by an output of supervisory module 126. In some embodiments, each energy storage module 132 is charged by an output of regulator module 204 (FIG. 2).

Although FIG. 1A shows storage device 120, FIG. 1A is intended more as a functional description of the various features which may be present in a storage device than as a structural schematic of the embodiments described herein. In practice, and as recognized by those of ordinary skill in the art, items shown separately could be combined and some items could be separated.

Figure 1B:
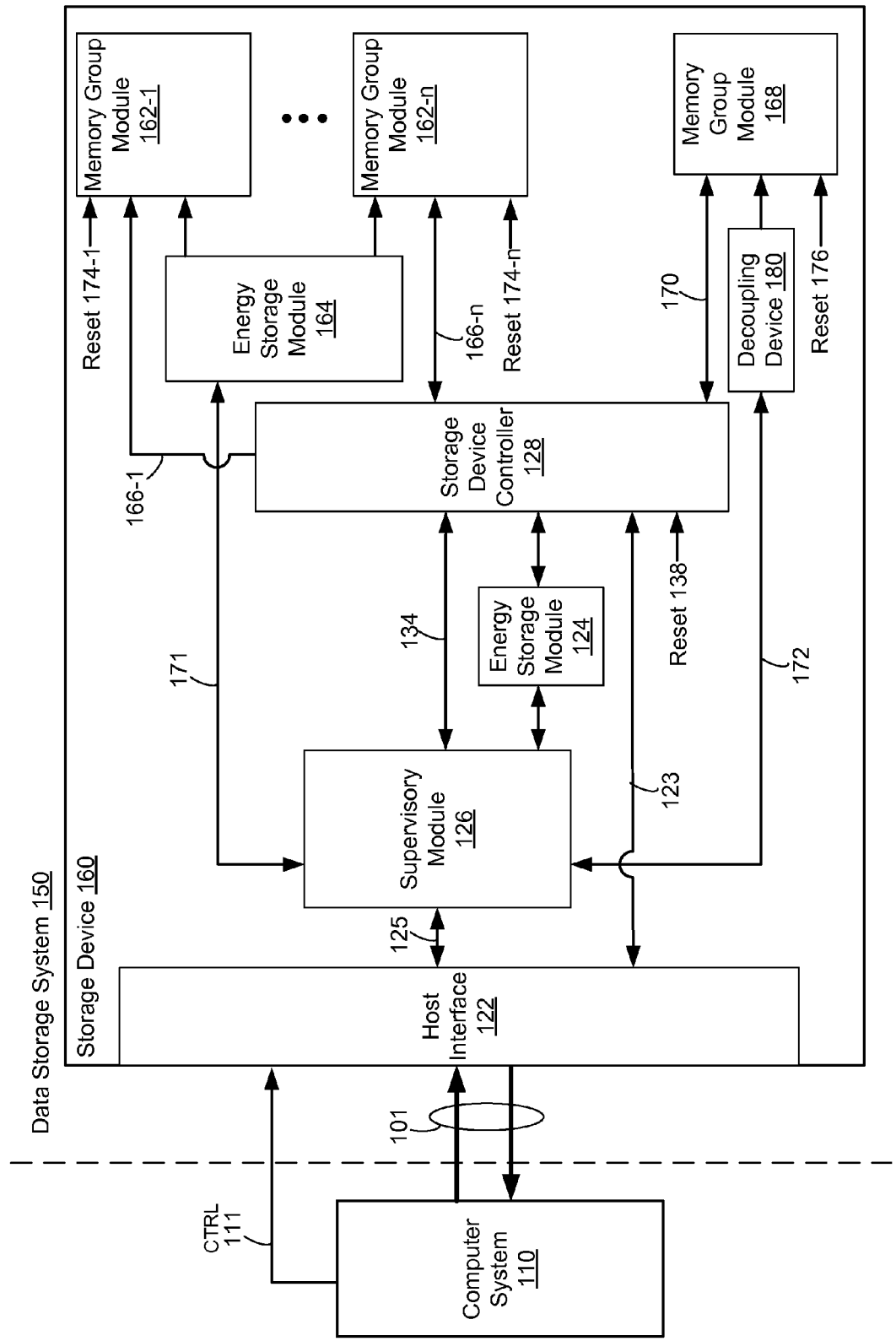
FIG. 1B is a block diagram illustrating another implementation of a data storage system, in accordance with some embodiments.

FIG. 1B is a block diagram illustrating an implementation of data storage system 150, in accordance with some embodiments. While some example features are illustrated, various other features have not been illustrated for the sake of brevity and so as not to obscure pertinent aspects of the example embodiments disclosed herein. To that end, as a non-limiting example, data storage system 150 includes storage device 160. Storage device 160 is used in conjunction with computer system 110. Storage device 160 includes host interface 122, supervisory module 126, storage device controller 128, memory group modules 162 (e.g., memory group modules 161-1 through 162-n), one or more memory group modules 168, one or more energy storage modules 164, and, optionally, energy storage module 124 and decoupling device 180. Energy storage module 164 is coupled to memory group modules 162-1 to 162-n, and provides power to those memory group modules during power failure operations, but is not coupled to storage device controller 128 and does not provide power to storage device controller 128 during power failure operations.

In some embodiments, storage device 120 includes a single memory group module 168 while in other embodiments storage device 120 includes a plurality of memory group modules 168. Storage device 160 also includes one or more communication lines that interconnect and control communications between system components. As shown in FIG. 1B, host interface 122 is coupled to supervisory module 126 via communication line 125; supervisory module 126 is coupled to storage device controller 128 via communication line 134; supervisory module 126 is coupled to energy storage module 164 via line 171 and coupled to decoupling device 180 via communication line 172; and storage device controller 128 is coupled to memory group modules 162 via lines 166. In some embodiments, a particular communication line is a communication bus and optionally includes circuitry for implementing communications and/or other functions.

In some embodiments, storage device 160 includes a host interface, supervisory module, energy storage modules, a storage device controller, and memory group modules analogous to the host interface, supervisory module, energy storage modules, storage device controller, and memory group modules of storage device 160 (FIG. 1A), or a subset thereof. Furthermore, storage device 160 optionally includes components and/or modules not present in storage device 120. For example, FIG. 1B shows storage device 160 including decoupling device 180, which is not included in storage device 120 shown in FIG. 1A.

Decoupling device 180 buffers power spikes in power received from a power source used during operation of the storage device. For example, in some embodiments, decoupling device 180 buffers power spikes in power received from supervisory module 126. In some embodiments, decoupling device 180 buffers power spikes in power received from regulator module 204 (FIG. 2). In some embodiments, decoupling device 180 includes one or more capacitors. Decoupling device 180 is not configured to power memory group module 168 during a power fail operation. In some instances, decoupling device 180 does not store sufficient energy to power memory group module 168 during a power fail operation.

Figure 3:
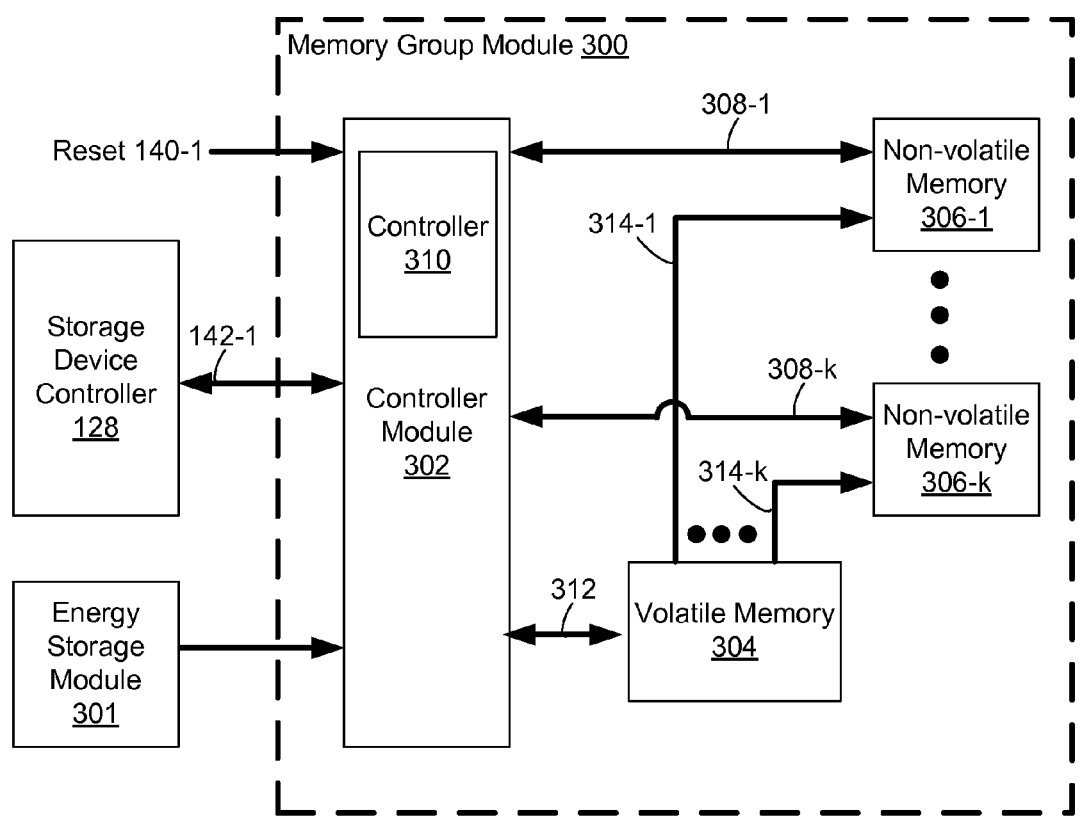
FIG. 3 is a block diagram illustrating an implementation of a memory group module, in accordance with some embodiments.

Memory group modules 162 each include a memory group module controller, non-volatile memory, and, optionally, volatile memory. In some embodiments, memory group modules 162 are analogous to memory group modules 130 in FIG. 1A. In some embodiments, each memory group module 162, or a particular memory group module 162, includes the components as shown in FIG. 3 for memory group module 300.

Memory group module 168 includes non-volatile memory and, optionally, a memory group module controller and/or volatile memory. In some embodiments, memory group module 168 is analogous to memory group modules 162. In some embodiments, memory group module 168 includes the components as shown in FIG. 3 for memory group module 300.

Although FIG. 1B shows storage device 160, FIG. 1B is intended more as a functional description of the various features which may be present in a storage device than as a structural schematic of the embodiments described herein. In practice, and as recognized by those of ordinary skill in the art, items shown separately could be combined and some items could be separated.

FIG. 2 is a block diagram illustrating an implementation of supervisory module 126 (of storage device 120, as shown in FIG. 1A), in accordance with some embodiments. Supervisory module 126 is coupled to host interface 122 via communication bus 212, voltage input 210 and voltage input 214. In some embodiments, voltage input 210 is a part of a communication bus. In some embodiments, voltage input 210 is the same as voltage input 214, while in other embodiments voltage input 210 is different from voltage input 214. In some embodiments, communication bus 212 includes a voltage source supplied through host interface 122.

Communication lines (e.g., communication line 224, FIG. 2) interconnect and controls communications between system components. In some embodiments, a particular communication line is a communication bus and optionally includes circuitry (sometimes called a chipset). Supervisory module 126 is coupled to host interface 122, storage device controller 128, energy storage module 124, energy storage modules 132, and, optionally, memory group modules 130 via communication lines (e.g., communication lines 226).

In some embodiments, supervisory module 126 includes power control processor (PCP) 202 (including regulator module 204 and serial presence detect (SPD) 203) for executing modules, programs and/or instructions stored therein. In some embodiments, PCP 202 is coupled to energy storage modules 132 via communication lines 226. In some embodiments, PCP 202 is coupled to one or more memory group modules (e.g., memory group modules 130, FIG. 1A) via communication lines. In some embodiments, communication lines 226 are part of a communication bus. In some embodiments, communication lines 226 are tri-state lines that are driven by PCP 202, energy storage modules 132, or neither, depending on the operations of supervisory module 126. PCP 202 is coupled to storage device controller 128 via communication line 224. In some embodiments, communication bus 224 includes a power test command and/or signal to notify storage device controller 128 of pending power fail operations affecting one or more NVM controllers 130.

Figure 8:
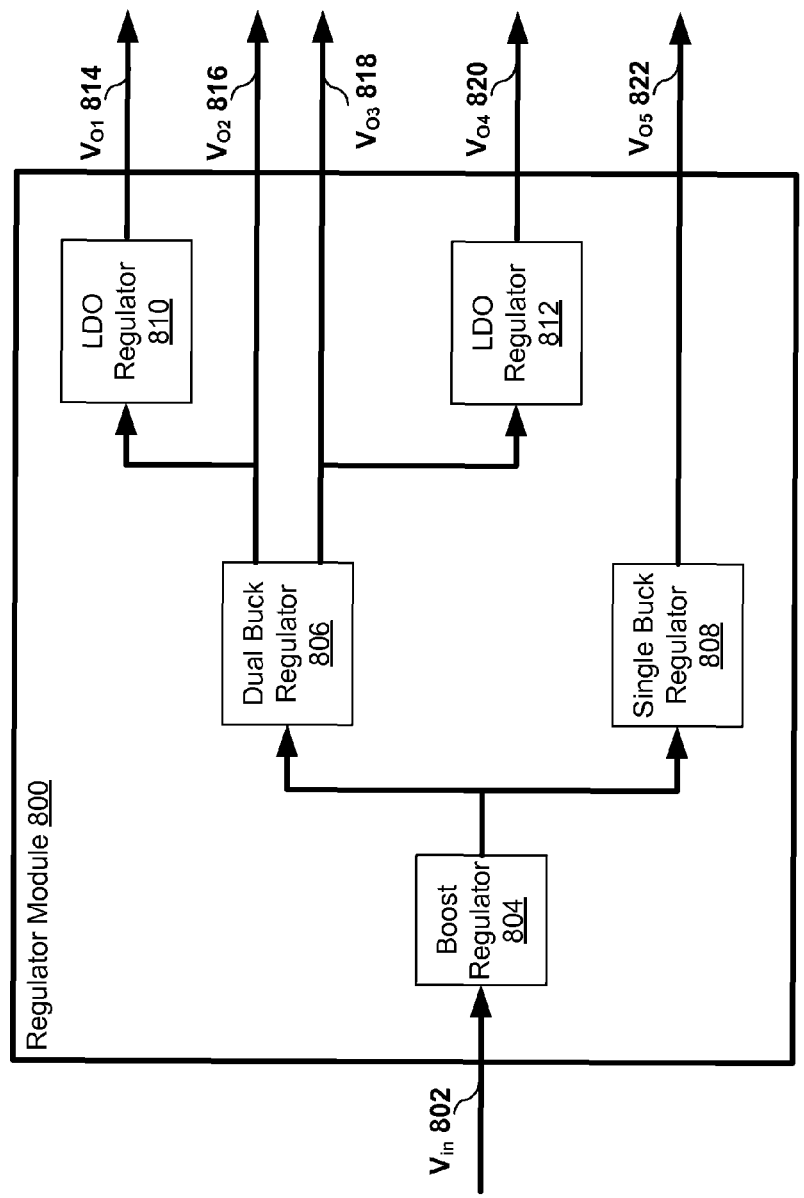
FIG. 8 is a block diagram illustrating an implementation of a regulator module, in accordance with some embodiments.
Figure 9A:
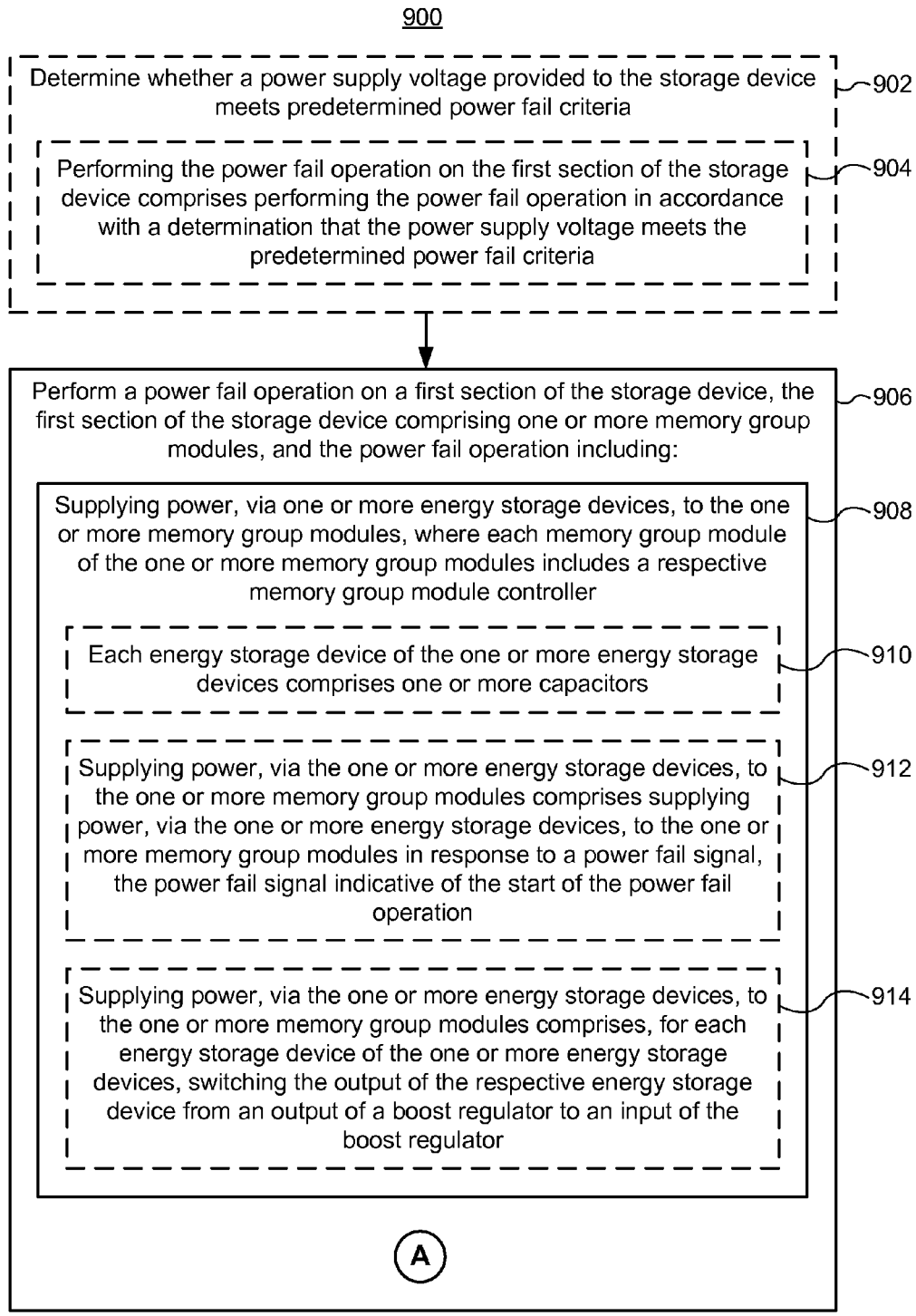
Figure 9C:
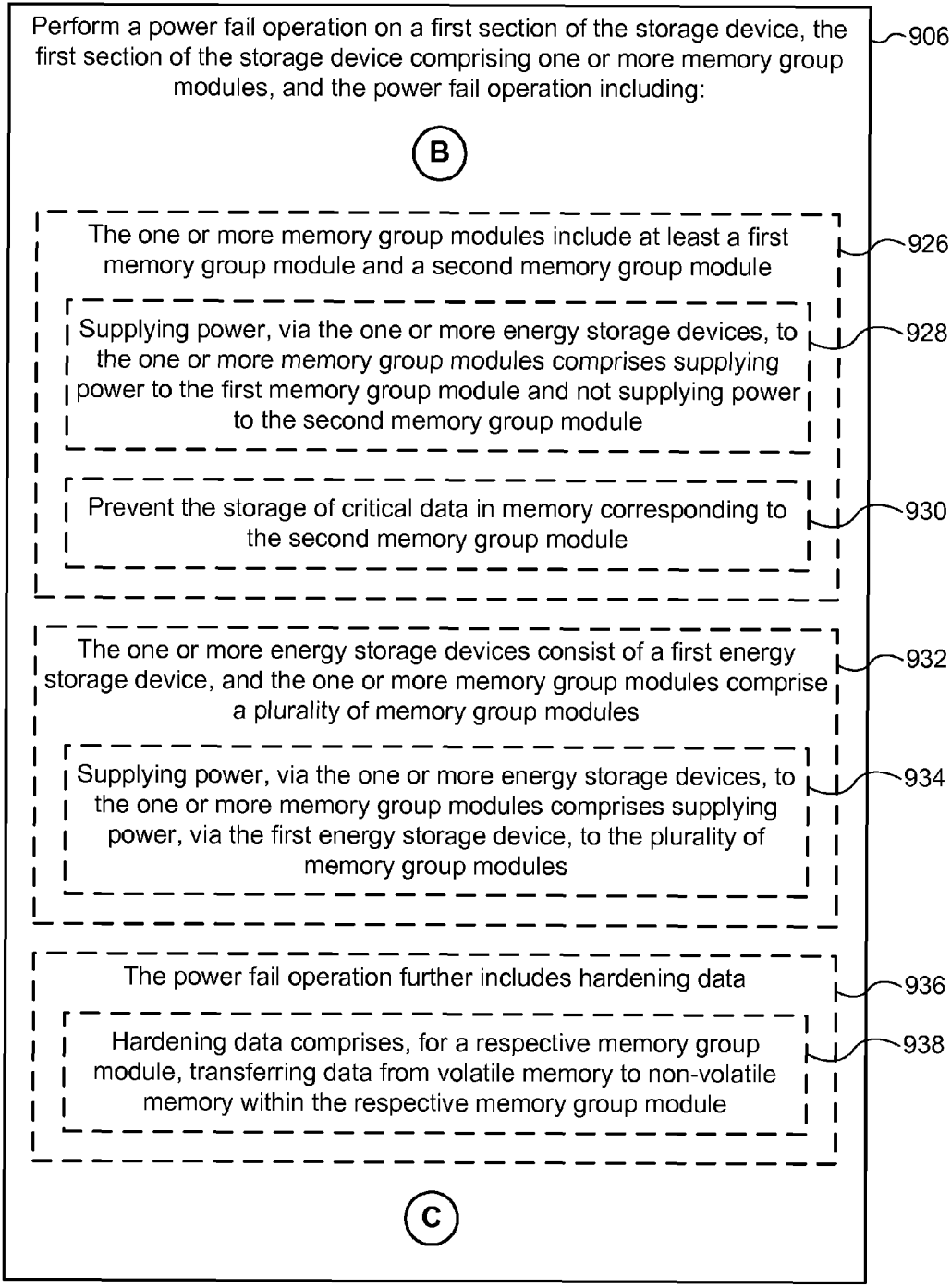
Figure 9D:
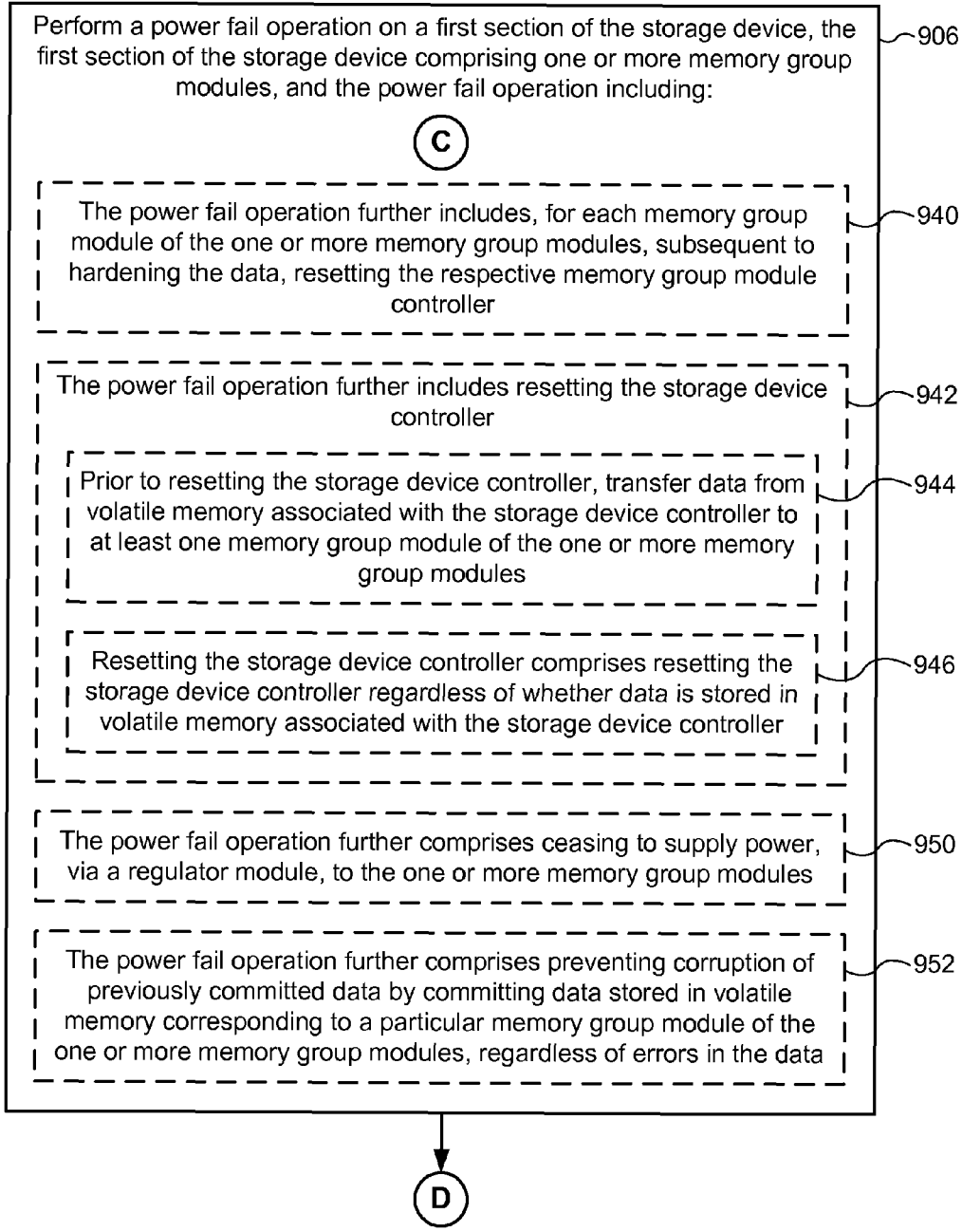
Figure 9E:
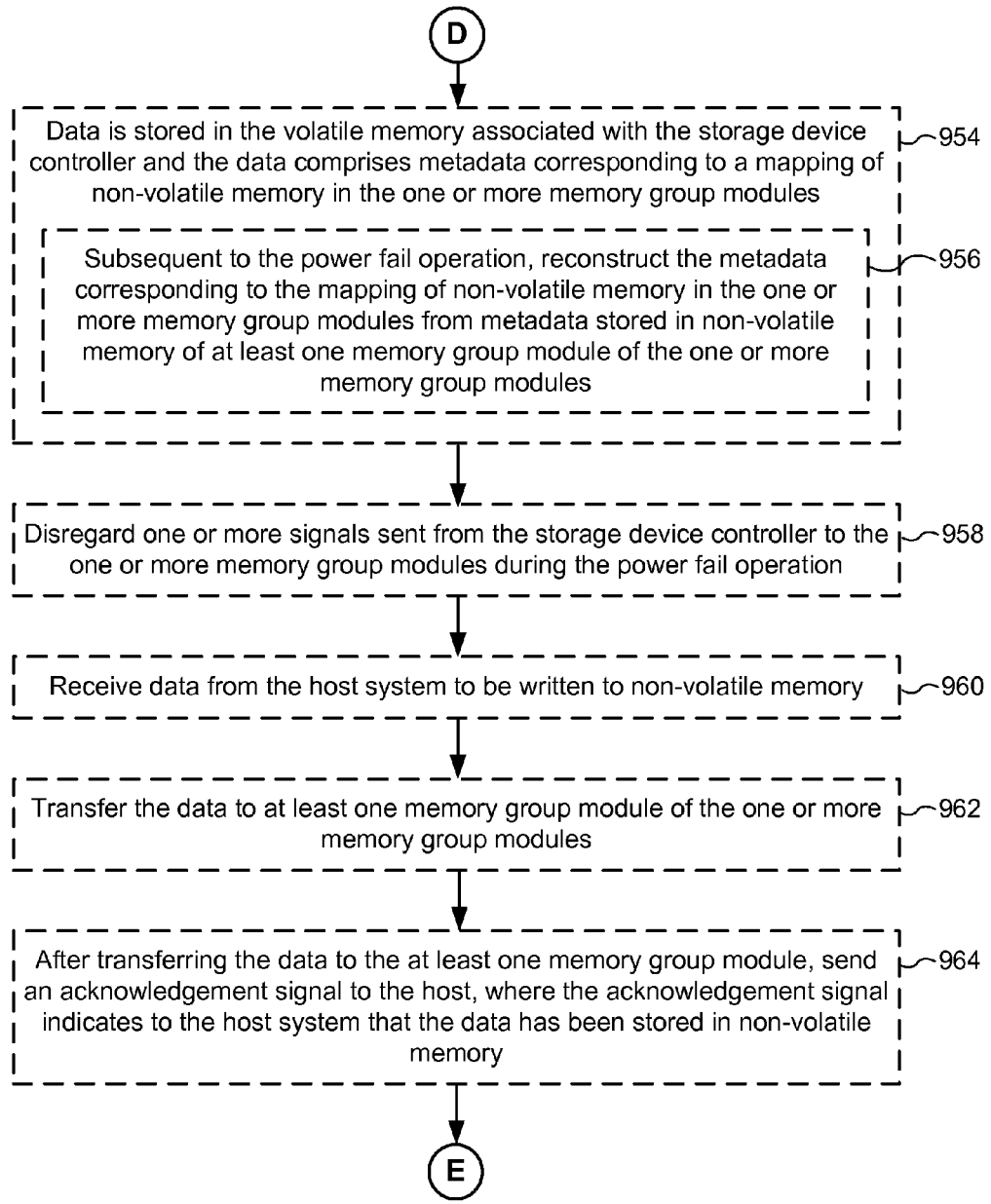
Figure 9F:
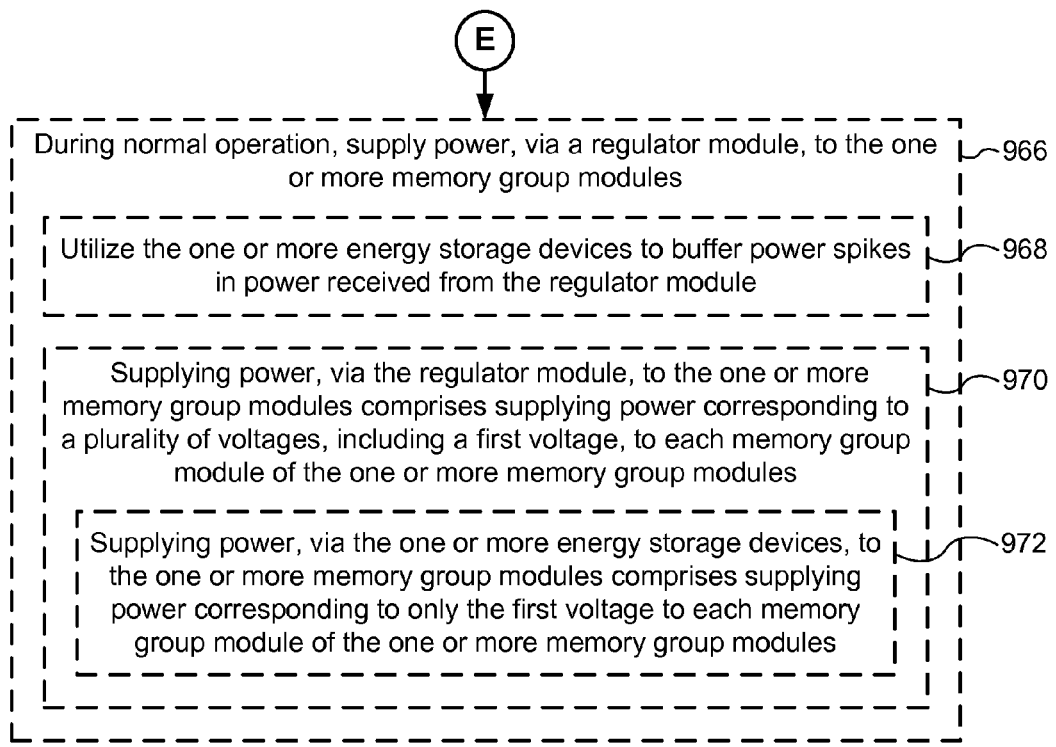

In some implementations, supervisory module 126 also includes regulator module 204, power failure (PFAIL) control module 208, voltage comparator circuitry 206, and a plurality of communication lines (e.g., communication lines 210, 212, 214, 224, 226, 228, 229, and 230). In some embodiments, regulator module 204 includes circuitry for monitoring, generating, and distributing power for a storage device (e.g., storage device 120, FIG. 1A). In some embodiments, regulator module 204 monitors, controls, charges, and/or tests one or more energy storage modules (e.g., energy storage module 124). While regulator module 204 is shown in FIG. 2 as being a component of PCP 202, in some embodiments, regulator module 204, or portions of regulator module 204, are external to PCP 202. In some embodiments, regulator module 204 includes the components as shown in FIG. 8 for regulator module 800.

In some embodiments, PCP 202 monitors and manages the functionality in regulator module 204. For example, PCP 202 monitors one or more input voltages (e.g., $V_{dd}$ 210). In some embodiments, if an input voltage (e.g., $V_{dd}$ 210) falls below corresponding under-voltage thresholds, PCP 202 signals a power fail condition to PFAIL control circuitry 208. In some embodiments, PCP 202 signals the power fail condition to a plurality of controllers on the storage device (e.g., storage device controller 128, FIG. 1A). In some embodiments, the under-voltage threshold varies depending on the target value of the voltage. For example, if the target voltage for $V_{dd}$ 210 is 1.5 volts, the under-voltage threshold may be 1.5 volts minus 5% (i.e., 1.425 volts), so PCP 202 would signal a power fail condition if $V_{dd}$ 210 is lower than 1.425 volts. In some embodiments, the under-voltage threshold for $V_{dd}$ 210 is different than the under-voltage threshold for a different input voltage.

In some embodiments, during regular operation of storage device 120, $V_{dd}$ 210 is used to supply power to the storage device (e.g., storage device 120, FIG. 1A). However, during a power fail operation or a soft power fail operation, one or more energy storage modules (e.g., energy storage module 124 and energy storage modules 132, FIG. 1A) are used to provide power to the storage device.

Further, in some embodiments, an output of regulator module 204 is used as an input to PCP 202, which, along with one or more input voltages provided by the host (e.g., computer system 110, FIG. 1A), provides power to PCP 202. In some embodiments, PCP 202 has one or more connections used to monitor and control other functions within the storage device. In some embodiments, a second input voltage (e.g., $V_{SPD}$) provides power to PCP 202. Furthermore, in some instances, the second input voltage (e.g., $V_{SPD}$) is provided to the storage device before $V_{dd}$ 210 is provided to the storage device, allowing devices in the storage device to operate before main power $V_{dd}$ 210 is provided.

Voltage comparator circuitry 206 is coupled to PCP 202 and PFAIL control module 208. In some embodiments, voltage comparator circuitry 206 includes circuitry for monitoring voltage input 214, detecting undervoltage and overvoltage conditions, and signaling power failure conditions to various components (e.g., PFAIL control module 208) of supervisory module 126. While voltage comparator circuitry 206 is shown in FIG. 2 as being external to PCP 202, in some embodiments, voltage comparator circuitry 206, or portions of voltage comparator circuitry 206, are embedded in PCP 202. Alternatively, in some embodiments, PCP 202 includes analog to digital conversion (ADC) circuitry, for converting voltage input 214 to a digital value, and comparison circuitry or software for detecting undervoltage and overvoltage conditions.

PFAIL control module 208 is coupled to PCP 202, voltage comparator circuitry 206, storage device controller 128, one or more energy storage modules (e.g., energy storage modules 132), and optionally one or more memory group modules (e.g., memory group modules 130, FIG. 1A). In some embodiments, PFAIL control module 208 includes circuitry to detect power fail conditions, signal power failures to storage device controller 128, signal power failures to one or more memory group modules, and signal power failures to one or more energy storage modules. In some embodiments, communication lines 230 are part of a communication bus between PFAIL control module 208 and the one or more energy storage devices.

SPD device 203 is coupled to host interface 122. In some embodiments, SPD 203 is a part of (e.g., integrated into) PCP 202, while in some other embodiments, SPD 203 is separate and distinct from PCP 202. Serial presence detect (SPD) refers to a standardized way to automatically access information about a computer memory module (e.g., storage device 120, FIG. 1A). For example, information about the type of the device (e.g., where the device type is one of a predefined set of device types), and the storage capacity of the device can be communicated with a host system (e.g., computer system 110) through SPD device 203. In another example, if the memory module has a failure, the failure can be communicated with a host system (e.g., computer system 110) through SPD device 203.

In some embodiments, supervisory module 126 (e.g., PCP 202) selectively tests one or more energy storage modules (e.g., energy storage module 124, FIG. 1A) during operation of the storage device. In some embodiments, each energy storage module includes one or more capacitors and the one or more capacitors are tested during regular operation of the storage device (as opposed to during a power fail operation). Since testing the capacitor(s) will discharge the capacitor(s), supervisory module 126 manages the coordination of testing the capacitor(s) to ensure that testing of the capacitor(s) from a respective energy storage device (e.g., energy storage device 164, FIG. 1B) does not interfere with other operations. In some embodiments, a memory module (e.g., energy storage device module 510, FIG. 5) is used to selectively test one or more energy storage modules during operation of the storage device, as described below with respect to FIG. 5.

In some embodiments, testing an energy storage module includes charging the energy storage module using a higher voltage than the power supply voltage provided to the storage device and determining whether the energy storage module meets a predefined minimum charge level threshold (sometimes called the minimum charge level threshold) within a predefined charge time. For example, if the predefined minimum charge level threshold is 95% of charge capacity and the predefined charge time is 25 milliseconds, the storage device determines whether the energy storage module is charged to at least 95% of charge capacity within 25 milliseconds. In some embodiments, a memory module (e.g., energy storage device module 510, FIG. 5) is used to determine whether the energy storage module meets a predefined minimum charge level threshold within a predefined charge time, as described below with respect to FIG. 5. Further, in accordance with a determination that a particular energy storage module does not meet the predefined minimum charge level threshold in the predefined charge time; the storage device prevents operation of the storage device or the portion of the storage device that corresponds to the particular energy storage module. In some embodiments, a determination that a particular energy storage module does not meet the predefined minimum charge level threshold in the predefined charge time indicates that there would be a data hardening failure when a power fail operation is performed in the future (e.g., a predictive failure detection). As a result, operation of at least a portion of the storage device is prevented to avoid a future data hardening failure. In some embodiments, preventing operation of at least a portion of the storage device includes communicating a failure message to a host system (e.g., computer system 110, FIG. 1). In some embodiments, the failure message is communicated with the host system through an SPD device (e.g., SPD device 203, FIG. 2) or an SPD bus controller.

Although FIG. 2 shows supervisory module 126, FIG. 2 is intended more as a functional description of the various features which may be present in a supervisory module than as a structural schematic of the embodiments described herein. In practice, and as recognized by those of ordinary skill in the art, items shown separately could be combined and some items could be separated.

FIG. 3 is a block diagram illustrating an implementation of memory group module 300, in accordance with some embodiments. While some example features are illustrated, various other features have not been illustrated for the sake of brevity and so as not to obscure pertinent aspects of the example embodiments disclosed herein. To that end, as a non-limiting example, memory group module 300 is coupled to energy storage module 301 (e.g., energy storage module 132-1, FIG. 1A) and storage device controller 128. As discussed above, energy storage module 301 is coupled to memory group module 300, but is not coupled to storage device controller 128 and does not provide power to storage device controller 128 during power failure operations. Memory group module 300 includes controller module 302, volatile memory 304, and non-volatile memories 306 (e.g., flash memory die or other non-volatile memory devices). Memory group module also includes one or more communication lines that interconnect and control communications between the components. Controller module 302 includes memory group module controller 310. As shown in FIG. 3, controller module 302 is coupled to non-volatile memory via lines 308; controller module 302 is coupled to volatile memory via line 312; and volatile memory 304 is coupled to non-volatile memories 306 via lines 314. In some embodiments, a particular communication line is a communication bus and optionally includes circuitry for implementing communications and/or other functions. In some embodiments, volatile memory 304 is a RAM buffer. While volatile memory 304 is shown in FIG. 3 as being a component of memory group module 300, in some embodiments, volatile memory 304 is external to memory group module 300. In some embodiments, non-volatile memories 306 comprise a plurality of flash memory arrays (e.g., multiple flash memory die). In some embodiments, non-volatile memories 306 include NAND-type flash memory and/or NOR-type flash memory.

Although FIG. 3 shows memory group module 300, FIG. 3 is intended more as a functional description of the various features which may be present in a memory group module than as a structural schematic of the embodiments described herein. In practice, and as recognized by those of ordinary skill in the art, items shown separately could be combined and some items could be separated.

Figure 4A:
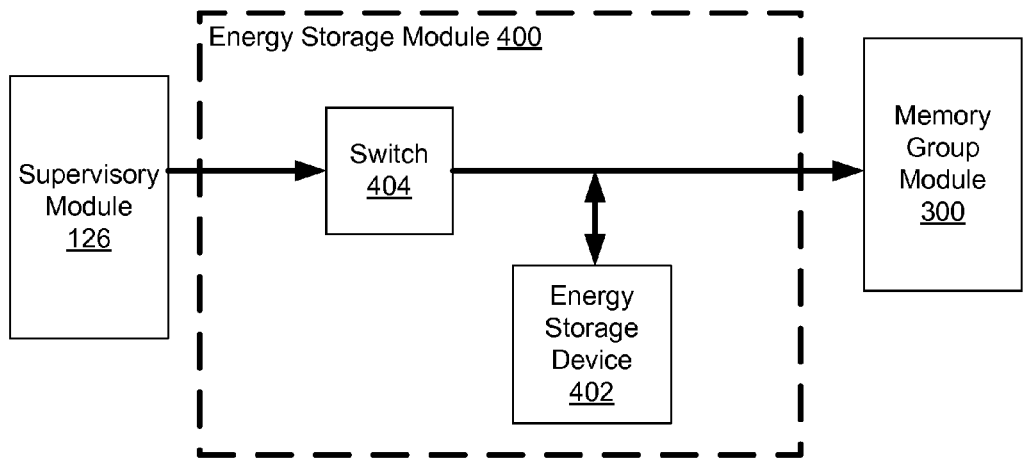
FIG. 4A is a block diagram illustrating an implementation of an energy storage module, in accordance with some embodiments.

FIG. 4A is a block diagram illustrating an implementation of energy storage module 400, in accordance with some embodiments. While some example features are illustrated, various other features have not been illustrated for the sake of brevity and so as not to obscure pertinent aspects of the example embodiments disclosed herein. To that end, as a non-limiting example, energy storage module 400 is coupled to supervisory module 126 and memory group module 300 (e.g., memory group module 130-1, FIG. 1A). Energy storage module 400 includes switch 404, sometimes called load switch 404, for decoupling memory group module 300 from an output of supervisory module 126, and also includes energy storage device 402 for supplying power to the one or more memory group modules during a power fail operation. In some embodiments, switch 404 comprises a transistor (e.g., a PFET). In some embodiments, energy storage device 402 comprises one or more capacitors. In some embodiments, energy storage device 402 includes one or more inductors or any other passive elements that store energy. In some embodiments, energy storage device 402 is charged up during normal operation of the storage device via an output of regulator module 204 (FIG. 2). In some embodiments, energy storage device 402 buffers power spikes in power received from a respective output of the supervisory module 126. In some embodiments, PCP 202 controls load switch 404. In some embodiments, load switch 404 is controlled by PFAIL control module 208. In some embodiments, energy storage module 301 (FIG. 3) is implemented as an instance of energy storage module 400. In some embodiments energy storage module 132-1 (FIG. 1A) is implemented as an instance of energy storage module 400. In some embodiments, energy storage module 124 (FIG. 1A) is implemented as an instance of energy storage module 400. In some embodiments, energy storage module 164 (FIG. 1B) is implemented as an instance of energy storage module 400.

Although FIG. 4A shows energy storage module 400, FIG. 4A is intended more as a functional description of the various features which may be present in an energy storage module than as a structural schematic of the embodiments described herein. In practice, and as recognized by those of ordinary skill in the art, items shown separately could be combined and some items could be separated.

Figure 4B:
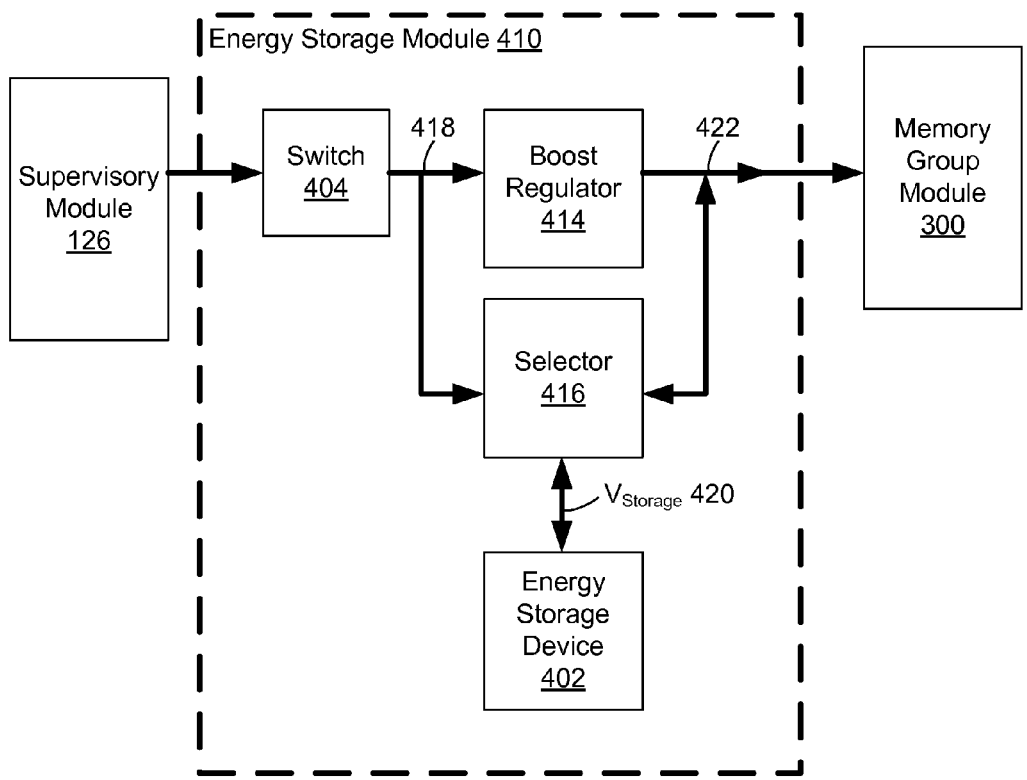
FIG. 4B is a block diagram illustrating another implementation of an energy storage module, in accordance with some embodiments.

FIG. 4B is a block diagram illustrating another implementation of energy storage module 410, in accordance with some embodiments. While some example features are illustrated, various other features have not been illustrated for the sake of brevity and so as not to obscure pertinent aspects of the example embodiments disclosed herein. To that end, as a non-limiting example, energy storage module 410 includes switch 404, energy storage device 402, boost regulator 414, and selector 416.

In some embodiments, energy storage module 410 includes a switch and an energy storage device analogous to the switch and/or the energy storage device of energy storage module 400 (FIG. 4A), or a subset thereof. Furthermore, energy storage module 410 optionally includes components and/or modules not present in energy storage module 400. For example, FIG. 4B shows energy storage module 410 including boost regulator 414 for boosting the voltage delivered to memory group module 300 and selector 416 for selectively coupling energy storage 402 to either the input or the output of boost regulator 414; both of which are not included in energy storage module 400 shown in FIG. 4A. In some embodiments, selector 416 comprises a switch. In some embodiments, selector 416 is configured to couple energy storage device 402 to the output of boost regulator 414 during normal operation so as to charge energy storage device 402. In some embodiments, selector 416 is governed by a supervisory module 126 (e.g., via communication line 230, FIG. 2).

In some embodiments, selector 416 is further configured to couple energy storage device 402 to the input of boost regulator 414 in response to receiving a power fail signal from PCP 202 (FIG. 2). By coupling energy storage device 402 to the input of boost regulator 414 during performance of at least a portion of the power fail operation, a larger portion of the energy stored in energy storage device 402 can be utilized to enable performance of the power fail operation than if the energy storage device 402 were coupled to the output of boost regulator 414. For example, with energy storage device 402 coupled to the output of boost regulator 414, the lowest useful output voltage from energy storage device 402 during a power fail operation might be a first voltage, such as 3 volts, but with energy storage device 402 coupled to the input of boost regulator 414 during at least a portion of the power fail operation, the lowest useful output voltage from energy storage device 402 during the power fail operation might be a second voltage, such as 2 volts or even 1 volt, which is lower than the first voltage.

As a result, a smaller size energy storage device 402 can be used to support a given power fail operation than would have been the case if the energy storage device 402 were coupled to the output of boost regulator 414 during performance of the power fail operation.

In some embodiments, selector 416 is configured to decouple energy storage device 402 from both the input and output of boost regulator 414 in some circumstances. For example, in some embodiments, removing power from memory group module 300 (e.g., memory group module 162-1, FIG. 1B) includes decoupling energy storage device 402 from both the input and output of boost regulator 414. In some embodiments, energy storage device 402 comprises a power holdup circuit, implemented using one or more capacitors. In some embodiments, energy storage device 402 stores, immediately prior to a power fail condition being detected, at least approximately 30 to 70 millijoules of energy.

In some embodiments, PCP 202 controls load switch 404 and selector 416 such that $V_{Storage}$ 420 is used to power memory group module 300 during a power fail or soft power fail operation. For example, during regular operation of a storage device (e.g., storage device 120, FIG. 1A), $V_{dd}$ 210 (FIG. 2) is used to supply power to the storage device, so load switch 404 is turned on (e.g., to complete the connection between supervisory module 126 and line 418). However, during a power fail operation or a soft power fail operation, energy storage device 402 is used to provide power to memory group module 300, so load switch 404 is turned off (e.g., to disable the connection between supervisory module 126 and line 418) and selector 416 is configured to couple energy storage device 402 to the input of boost regulator 414 (e.g., to enable the connection between $V_{Storage}$ 420 and line 418). Any energy storage device, including one or more capacitors, one or more inductors, or one or more other passive elements that store energy, may be used to store energy to be used during a power fail operation or a soft power fail operation.

In some embodiments, energy storage device 402 is charged using an output of boost regulator 414. In some embodiments, boost regulator 414 is controlled and enabled by PCP 202 (FIG. 2).

In some embodiments, energy storage module 410 includes a comparator. The comparator is configured to determine whether an output of energy storage device 402 (e.g., $V_{Storage}$ 420) falls below a predetermined voltage threshold and to signal selector 416 in accordance with a determination that the output of energy storage device 402 has fallen below the predetermined threshold. In some embodiments, the predetermined voltage threshold is determined based on a minimum operating voltage of memory group module 300 (e.g., memory group module 130-1, FIG. 1A). In some embodiments, the predetermined voltage threshold is based on an optimal operating voltage of memory group module 300.

As a non-limiting example, during normal operation of a storage device (e.g., storage device 120, FIG. 1A), energy storage device 402 is coupled, via selector 416, to the output of boost regulator 414 (e.g., such that $V_{Storage}$ 420 is connected to line 422). In this example, in response to detecting a power fail condition, PCP 202 will signal load switch 404 to decouple supervisory module 126 from line 418. In this example, energy storage device 402 is coupled to the output of boost regulator 414 and provides power to memory group module 300 (e.g., memory group module 162-1, FIG. 1B) until the comparator determines that $V_{Storage}$ 420 has dropped below the predetermined threshold; at which time, the comparator signals to selector 416 to selectively couple energy storage device 402 to the input of boost regulator 414. Once energy storage device 402 is selectively coupled to the input of boost regulator 414 (e.g., such that $V_{Storage}$ 420 is connected to line 418) $V_{Storage}$ 420 is boosted by boost regulator 414 and continues to supply power to memory group nodule 300 until the power fail operations are complete or the boosted voltage generated by boost regulator 414 falls below a predetermined minimum operating threshold.

In some embodiments, energy storage module 301 (FIG. 3) is implemented as an instance of energy storage module 410. In some embodiments, energy storage module 132-1 (FIG. 1A) is implemented as an instance of energy storage module 410. In some embodiments, energy storage module 124 (FIG. 1A) is implemented as an instance of energy storage module 410. In some embodiments, energy storage module 164 (FIG. 1B) is implemented as an instance of energy storage module 410.

Although FIG. 4B shows energy storage module 410, FIG. 4B is intended more as a functional description of the various features which may be present in an energy storage module than as a structural schematic of the embodiments described herein. In practice, and as recognized by those of ordinary skill in the art, items shown separately could be combined and some items could be separated.

Figure 5:
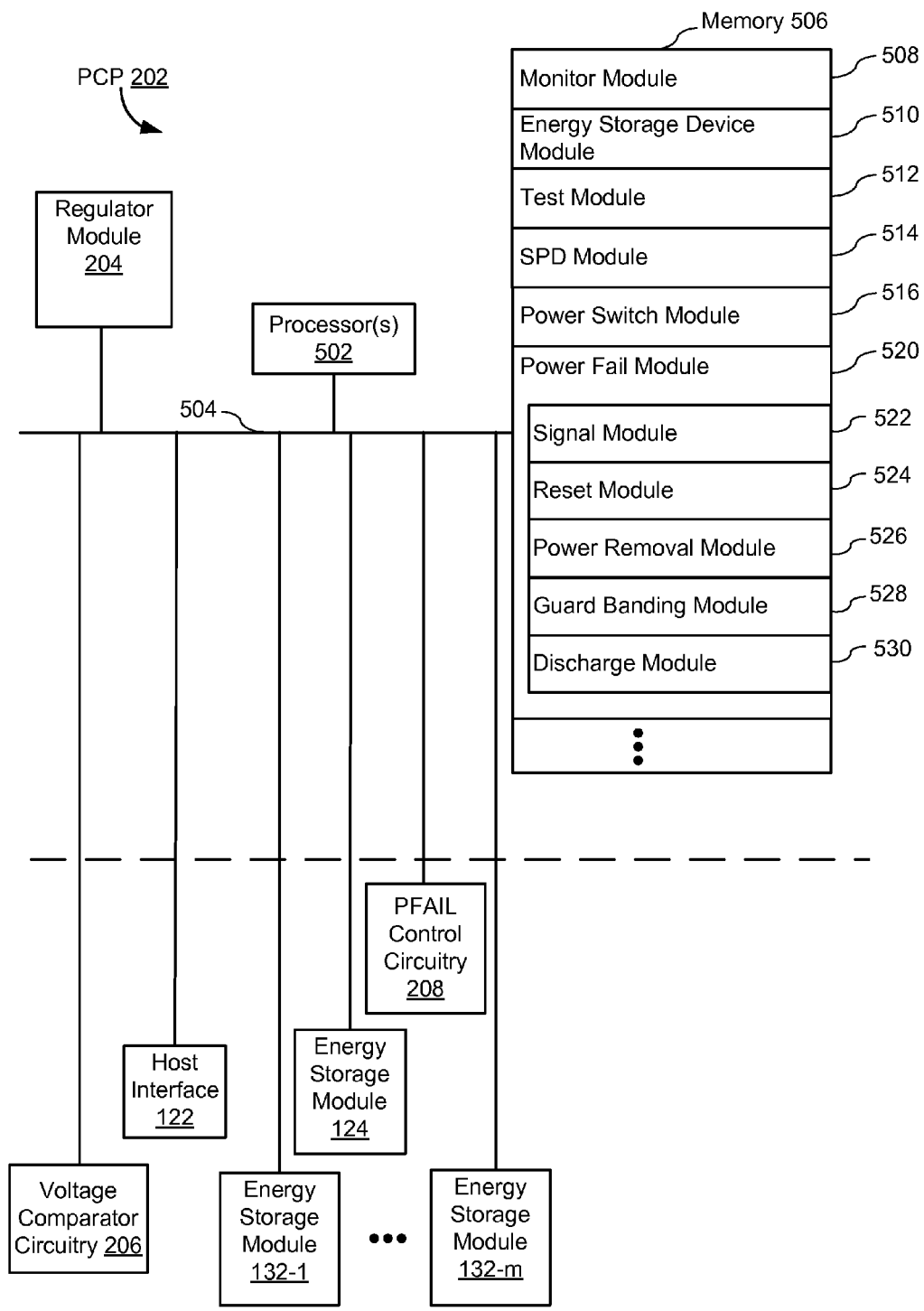
FIG. 5 is a block diagram illustrating an implementation of a power control processor (PCP), in accordance with some embodiments.

FIG. 5 is a block diagram illustrating an implementation of PCP 202, in accordance with some embodiments. PCP 202 includes one or more processors (also sometimes called CPUs or processing units or microprocessors or microcontrollers) 502 for executing modules, programs and/or instructions stored in memory 506 and thereby performing processing operations, memory 506, and one or more communication buses 504 for interconnecting these components. Communication buses 504 optionally include circuitry (sometimes called a chipset) that interconnects and controls communications between system components. PCP 202 is coupled to host interface 122, energy storage module 124, energy storage modules 132, voltage comparator circuitry 206, and PFAIL control module 208 by communication buses 504. In some embodiments, PCP 202 is further coupled to storage device controller 128 and one or more memory group modules (e.g., memory group modules 130, FIG. 1A). Memory 506 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 506 optionally includes one or more storage devices remotely located from processor(s) 502. Memory 506, or alternately the non-volatile memory device(s) within memory 506, comprises a non-transitory computer readable storage medium. In some embodiments, memory 506, or the computer readable storage medium of memory 506 stores the following programs, modules, and data structures, or a subset thereof:

monitor module 508 that is used for monitoring signals provided to a storage device (e.g., storage device 120, FIG. 1), for example to monitor and determine whether a power supply voltage provided to the storage device is lower than an under-voltage threshold;

energy storage device module 510 that is used for monitoring, controlling, charging, and/or testing an energy storage modules (e.g., energy storage module 124) on the storage device;

test module 512 that is used for testing one or more functions of the storage device;

SPD module 514 for accessing information about a computer memory module and/or communicating with a host system;

power switch module 516 that is used for determining and controlling the voltage that is used to supply power to the storage device; and power fail module 520 that is used for performing a power fail operation or a soft power fail operation in response to certain criterion or signals.

In some embodiments, memory 506, or the computer readable storage medium of memory 506 further stores a configuration module for configuring storage device 120 and supervisory module 126, and/or configuration values (such as one or more under-voltage threshold values) for configuring supervisory module 126, neither of which is explicitly shown in FIG. 5. In some embodiments, upon power up and upon reset, the configuration module automatically sets the values of one or more configuration parameters of a storage device (and, optionally, determines which of two or more power fail modules, test modules, etc. to use) in accordance with the components of the storage device (e.g., the type of non-volatile memory components in the storage device) and/or characteristics of a data storage system (e.g., data storage system 100, FIG. 1A) that includes the storage device (e.g., storage device 120, FIG. 1A).

In some embodiments, power fail module 520 includes the following modules or sub-modules, or a subset thereof:

signal module 522 that is used for signaling a power fail condition to a plurality of energy storage modules (e.g., energy storage modules 132, FIG. 1A) and/or a plurality of controllers on the storage device (e.g., storage device controller 128 and/or memory group module controllers 310, FIG. 3);

reset module 524 that is used for resetting one or more controllers (e.g., storage device controller 128, and/or one or more of memory group module controllers 310, FIG. 3) of the storage device;

power removal module 526 that is used for removing power from one or more controllers (e.g., storage device controller 128, and/or one or more of memory group module controllers 310, FIG. 3) of the storage device;

guard banding module 528 that is used for tolerating power fluctuations in a power supply voltage provided to the storage device; and discharge module 530 that is used for discharging an energy storage device (e.g., energy storage module 124, FIG. 1A) on the storage device.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 506 may store a subset of the modules and data structures identified above. Furthermore, memory 506 may store additional modules and data structures not described above. In some embodiments, the programs, modules, and data structures stored in memory 506, or the computer readable storage medium of memory 506, provide instructions for implementing respective operations in the methods described below with reference to FIGS. 9A-9F.

Although FIG. 5 shows PCP 202, FIG. 5 is intended more as a functional description of the various features which may be present in a PCP than as a structural schematic of the embodiments described herein. In practice, and as recognized by those of ordinary skill in the art, items shown separately could be combined and some items could be separated.

Figure 6:
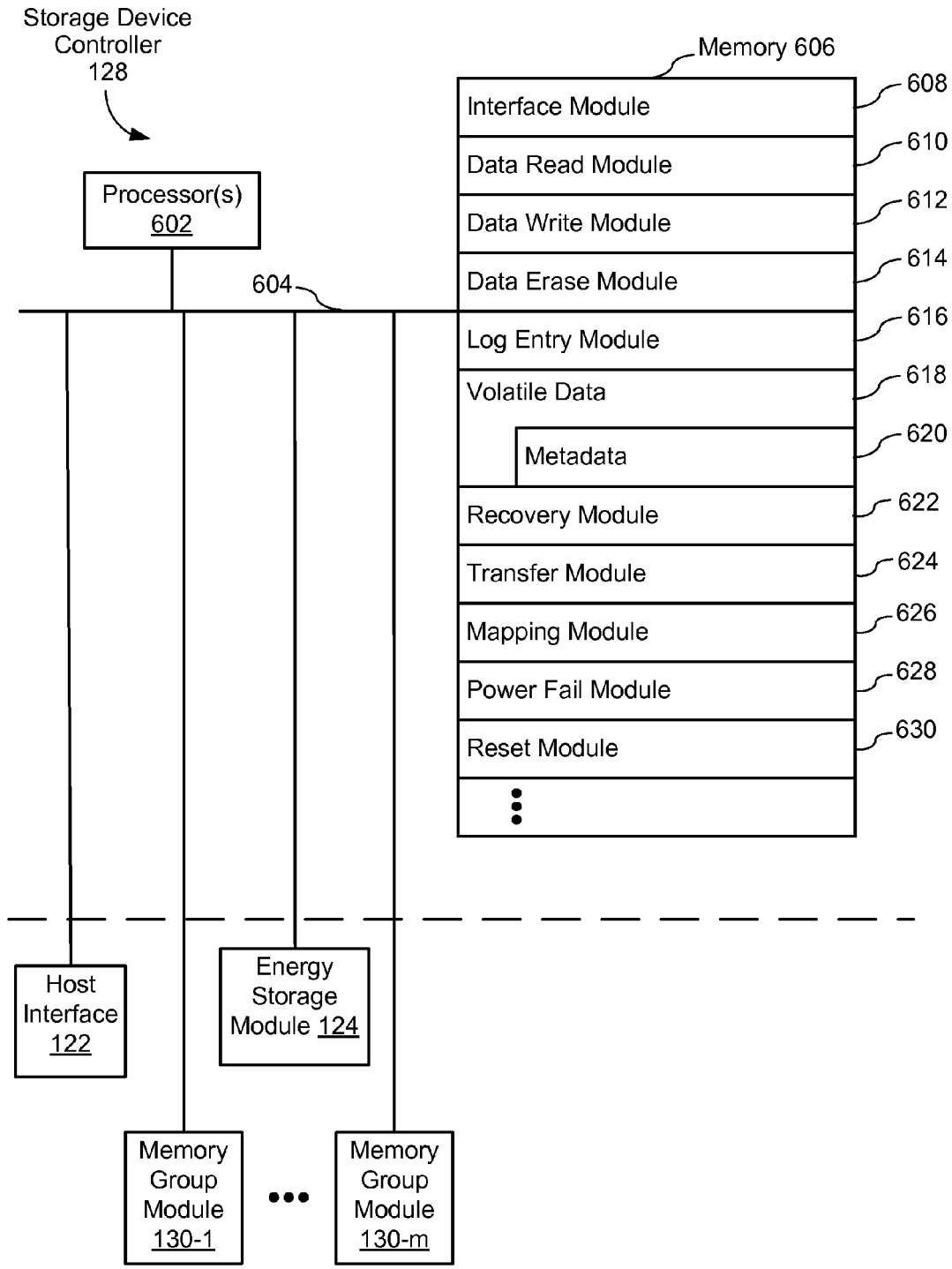
FIG. 6 is a block diagram illustrating an implementation of a storage device controller, in accordance with some embodiments.

FIG. 6 is a block diagram illustrating an implementation of storage device controller 128, in accordance with some embodiments. Storage device controller 128 typically includes: one or more processors (also sometimes called CPUs or processing units or microprocessors or microcontrollers) 602 for executing modules, programs and/or instructions stored in memory 606 and thereby performing processing operations; memory 606; and one or more communication buses 604 for interconnecting these components. One or more communication buses 604, optionally, include circuitry (sometimes called a chipset) that interconnects and controls communications between system components. Storage device controller 128 is operatively coupled to host interface 122, memory group modules 130 (e.g., memory group module 130-1 through 130-m), and, optionally, supervisory module 126 by communication buses 604. Memory 606 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. In some embodiments, the information stored in memory 606 includes volatile data 618 corresponding to portions of non-volatile memory within the data storage system (e.g., NVMs 306, FIG. 3). In some embodiments, the information stored in memory 606 includes metadata 620 (e.g., metadata comprising age category, known-bad portion, etc.) corresponding to portions of the non-volatile memory. Memory 606, optionally, includes one or more storage devices remotely located from the one or more CPUs 602. Memory 606, or alternatively the non-volatile memory device(s) within memory 606, comprises a non-transitory computer readable storage medium. In some embodiments, memory 606, or the non-transitory computer readable storage medium of memory 606, stores the following programs, modules, and data structures, or a subset or superset thereof:

interface module 608 that is used for communicating with other components, such as host interface 122, energy storage module 124, and memory group modules 130;

data read module 610 for performing a read operation to read data from non-volatile memory (e.g., a persistent data store including non-volatile memory such as flash memory) according to a read command from computer system 110;

data write module 612 for performing a write operation to write data (e.g., a record including write data and a log entry) to non-volatile memory according to a write command from computer system 110;

data erase module 614 for performing an erase operation to erase data from non-volatile, according to an erase command from computer system 110 and/or according to a garbage collection erase command (generated internally by storage device controller 128, or externally to storage device controller 128);

log entry module 616 for generating a log entry associated with respective data;

recovery module 622 for performing a recovery process, or causing a recovery process to be performed, in response to detecting an error condition or synchronization command;

transfer module 624 that is used for transferring data held in volatile memory to non-volatile memory;

mapping module 626, which maps logical addresses in a logical address space (e.g., a logical address space of a host or client system) to physical addresses in a physical address space (e.g., a physical address space of storage device 120) for respective portions of the non-volatile memory within a data storage system, and optionally maps physical addresses for respective portions of the non-volatile memory to logical addresses. In some embodiments, mappings module 626 excludes known-bad portions of the non-volatile memory from the maps;

power fail module 628 that is used for performing a power fail operation or a soft power fail operation; and reset module 630 that is used for resetting storage device controller 128.

In some embodiments, power fail module 628 optionally includes a transfer sub-module that is used for transferring data held in volatile memory to non-volatile memory during a power fail operation. In some embodiments, transfer module 624 is used to transfer data held in volatile memory to non-volatile memory during a power fail operation.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 606 may store a subset of the modules and data structures identified above. Furthermore, memory 606 may store additional modules and data structures not described above. In some embodiments, the programs, modules, and data structures stored in memory 606, or the computer readable storage medium of memory 606, provide instructions for implementing respective operations in the methods described below with reference to FIGS. 9A-9F.

Although FIG. 6 shows a storage device controller 128, FIG. 6 is intended more as a functional description of the various features which may be present in a memory controller than as a structural schematic of the embodiments described herein. In practice, and as recognized by those of ordinary skill in the art, items shown separately could be combined and some items could be separated.

Figure 7:
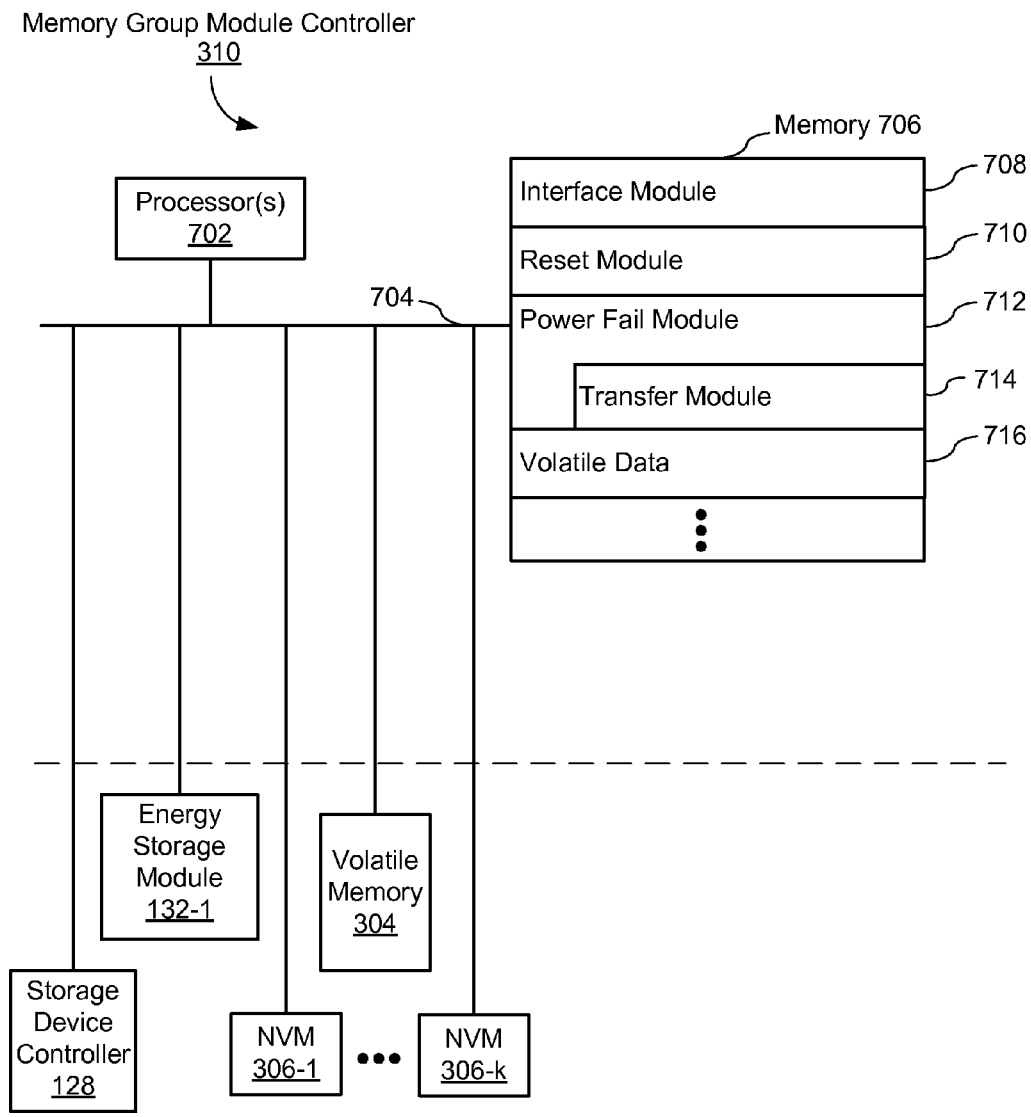
FIG. 7 is a block diagram illustrating an implementation of a memory group module controller, in accordance with some embodiments.

FIG. 7 is a block diagram illustrating an implementation of memory group module controller 310, such as a flash controller, in accordance with some embodiments. Memory group module controller 310 typically includes one or more processors (also sometimes called CPUs or processing units or microprocessors or microcontrollers) 702 for executing modules, programs and/or instructions stored in memory 706 and thereby performing processing operations, memory 706, and one or more communication buses 704 for interconnecting these components. Communication buses 704 optionally include circuitry (sometimes called a chipset) that interconnects and controls communications between system components. Memory group module controller 310 is coupled to storage device controller 128, a respective energy storage module 132 (e.g., energy storage module 132-1), volatile memory 304, non-volatile memories 306, and, optionally, supervisory module 126 by communication buses 704. Memory 706 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. In some embodiments, memory 706 includes volatile data 716 corresponding to portions of non-volatile memory within the data storage system (e.g., NVMs 306, FIG. 3). Memory 706 optionally includes one or more storage devices remotely located from processor(s) 702. Memory 706, or alternately the non-volatile memory device(s) within memory 706, comprises a non-transitory computer readable storage medium. In some embodiments, memory 706, or the computer readable storage medium of memory 706 stores the following programs, modules, and data structures, or a subset thereof:

- interface module 708 that is used for communicating with other components, such as storage device controller 128, volatile memory 304, and NVMs 306;
- reset module 710 that is used for resetting memory group module controller 310; and
- power fail module 712 that is used for performing a power fail operation or a soft power fail operation.

In some embodiments, power fail module 712 optionally includes transfer sub-module 714 that is used for transferring data held in volatile memory to non-volatile memory during a power fail operation.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 706 may store a subset of the modules and data structures identified above. Furthermore, memory 706 may store additional modules and data structures not described above. In some embodiments, the programs, modules, and data structures stored in memory 706, or the computer readable storage medium of memory 706, provide instructions for implementing respective operations in the methods described below with reference to FIGS. 9A-9F.

Although FIG. 7 shows memory group module controller 310, FIG. 7 is intended more as a functional description of the various features which may be present in a NVM controller than as a structural schematic of the embodiments described herein. In practice, and as recognized by those of ordinary skill in the art, items shown separately could be combined and some items could be separated.

FIG. 8 is a block diagram illustrating an implementation of regulator module 800, in accordance with some embodiments. While some example features are illustrated, various other features have not been illustrated for the sake of brevity and so as not to obscure pertinent aspects of the example embodiments disclosed herein. A regulator module typically includes one or more regulators (also sometimes called power control systems or power regulators) used to power various components of a storage device (e.g., energy storage modules 132) via one or more connection. To that end, as a non-limiting example, regulator module 800 includes boost regulator 804 for boosting input voltage $V_{in}$ 802 (e.g., 5.00 volts). Regulator module 800 also includes dual buck regulator 806 for generating $V_{O2}$ 816 (e.g., 2.85 volts) and $V_{O3}$ 818 (e.g., 1.80 volts) and single buck regulator 808 for generating $V_{O5}$ 822 (e.g., 1.00 volts). Regulator module 800 further includes low dropout (LDO) regulator 810 for generating $V_{O1}$ 814 (e.g., 1.35 volts) and LDO regulator 812 for generating $V_{O4}$ 820 (e.g., 2.50 volts). In some embodiments, $V_{in}$ 802 is a voltage supplied by a host system (e.g., computer system 110, FIG. 1) and has a target value of 5 volts or less. In some embodiments, regulator module 800 is embedded in a PCP (e.g., regulator module 204, FIG. 2). Alternatively, in some embodiments, regulator module 800, or portions thereof, are external to the PCP. In some embodiments, regulator module 800 is regulator module 204.

Although FIG. 8 shows regulator module 800, FIG. 8 is intended more as a functional description of the various features which may be present in a regulator module than as a structural schematic of the embodiments described herein. In practice, and as recognized by those of ordinary skill in the art, items shown separately could be combined and some items could be separated.

FIGS. 9A-9F illustrate a flowchart representation of method 900 of power management in a storage device, in accordance with some embodiments. In some embodiments, the storage device is or includes a solid-state drive implemented as a dual in-line memory module (DIMM) device. In some embodiments, the storage device is compatible with a DIMM memory slot. For example, in some embodiments, the storage device is compatible with a 240-pin DIMM memory slot using a DDR3 interface specification. In some embodiments, the storage device (e.g., storage device 120, FIG. 1A) coordinates and manages multiple sub-system components to manage power and harden data, which initiates performance of method 900. At least in some embodiments, method 900 is performed by a storage device (e.g., storage device 120, FIG. 1A) or one or more components of the storage device (e.g., supervisory module 126, storage device controller 128, and/or memory group modules 130, FIG. 1A). In some embodiments, method 900 is governed by instructions that are stored in a non-transitory computer readable storage medium and that are executed by one or more processors of a device, such as the one or more processors 502 of PCP 202, the one or more processors 602 of storage device controller 128, and/or the one or more processors 702 of a respective memory group module 130, as shown in FIGS. 5-7.

In some embodiments, the storage device determines (902) whether a power supply voltage provided to the storage device meets predetermined power fail criteria. For example, the aforementioned power supply voltage can be a power supply voltage provided by computer system 110 (FIG. 1A), such as $V_{dd}$ 210 as shown in FIG. 2. In some embodiments, the regulator module (e.g., regulator module 204, FIG. 2) is configured to determine whether a power supply voltage provided to the storage device meets predetermined power fail criteria. In some embodiments, the storage device controller (e.g., storage device controller 128, FIG. 1A) is configured to determine whether a power supply voltage provided to the storage device meets predetermined power fail criteria. In some embodiments, the predetermined power fail criteria include an under-voltage threshold (sometimes also called a trip point) that varies depending on the target value of the voltage. For example, if the target value of the power supply voltage is 1.5 volts, the under-voltage threshold may be 1.5 volts minus 5% (i.e., 1.425 volts), and the storage device determines whether the power supply voltage is lower than 1.425 volts. In some embodiments, a monitor module (e.g., monitor module 508, FIG. 5) is used to determine whether a power supply voltage provided to a storage device is lower than an under-voltage threshold. In some embodiments, the power supply voltage is a voltage supplied by a host system (e.g., computer system 110, FIG. 1A). In some embodiments, the voltage supplied by a host system (e.g., $V_{dd}$ 210, FIG. 2) has a target value of 1.5 volts or less. For example, for a double data rate type three (DDR3) interface specification, the supply voltage is typically 1.5 volts or 1.35 volts.

In some embodiments, performing the power fail operation on the first section of the storage device includes (904) performing the power fail operation in accordance with a determination that the power supply voltage meets the predetermined power fail criteria. In some embodiments, the predetermined power fail criteria include the power supply voltage falling below a predetermined voltage threshold. In some embodiments, the predetermined power fail criteria include the power supply voltage falling below a predetermined voltage threshold for a predetermined amount of time. Using the example above where the target value of the power supply voltage is 1.5 volts and the under-voltage threshold is 1.425 volts, in accordance with a determination that the power supply voltage is lower than 1.425 volts, the storage device performs a power fail operation. In some embodiments, a power fail module (e.g., power fail module 520, FIG. 5) is used to perform a power fail operation, in accordance with a determination that the power supply voltage meets the predetermined power fail criteria.

The storage device performs (906) a power fail operation on a first section of the storage device, the first section of the storage device including one or more memory group modules. In some embodiments, the first section of the storage device comprises the entire storage device. For example, FIG. 1A shows storage device 120 including memory group modules 130 and, in accordance with some embodiments, the first section of the storage device comprises memory group modules 130. In some embodiments, the first section of the storage device corresponds to a section of the storage device controlled by a storage device controller. For example, FIG. 1B shows storage device 120 including storage device controller 128 and, in accordance with some embodiments, the first section of the storage device comprises memory group modules 162 and memory group module 168.

In some embodiments, one or more power supply voltages are monitored for under-voltage thresholds and the power fail operation is performed if any of the monitored power supply voltages fall below their respective under-voltage thresholds. For example, if two power supply voltages (e.g., a first power supply voltage and a second power supply voltages) are monitored for under-voltage thresholds (e.g., a first under-voltage threshold and a second under-voltage threshold, respectively), the power fail operation is performed in accordance with a determination that the first power supply voltage is lower than the first under-voltage threshold and the power fail operation is performed in accordance with a determination that the second power supply voltage is lower than the second under-voltage threshold. The under-voltage threshold varies based on the target value of the power supply voltage. In some embodiments, the first power supply voltage is a voltage supplied by a host system (e.g., with a target value of 1.5 volts or less) and the second power supply voltage is a voltage supplied for serial presence detect (SPD) functionality (e.g., with a target value of 3.3 volts).

The power fail operation includes supplying (908) power, via one or more energy storage devices, to the one or more memory group modules, where each memory group module of the one or more memory group modules includes a respective memory group module controller. Each of these energy storage devices is coupled to and provides power during a power fail operation to one or more of the memory group modules, but is not coupled to and does not provide power to the storage device controller of the storage device. For example, FIG. 1A shows each energy storage module in energy storage modules 132 coupled to a respective memory group module in memory group modules 130 and, in accordance with some embodiments, each energy storage module supplies power to the respective memory group module during a power fail operation. In addition, FIG. 3 shows memory group module 300 including memory group module controller 310.

In some embodiments, each energy storage device of the one or more energy storage devices includes (910) one or more capacitors. For example, in some embodiments, a particular energy storage device includes a single capacitor, while in other embodiments, the particular energy storage device includes a plurality of capacitors. In some embodiments, at least a subset of the energy storage devices includes one or more inductors. In some embodiments, at least a subset of the energy storage devices includes one or more other passive elements that store energy.

In some embodiments, supplying power, via the one or more energy storage devices, to the one or more memory group modules includes (912) supplying power, via the one or more energy storage devices, to the one or more memory group modules in response to a power fail signal, the power fail signal indicative of the start of the power fail operation. In some embodiments, the power fail signal is generated by the storage device controller (e.g., storage device controller 128, FIG. 1A). In some embodiments, the power fail signal is generated by the regulator module (e.g., regulator module 204, FIG. 2). In some embodiments, the power fail signal is generated by a PFAIL control module (e.g., PFAIL control module 208, FIG. 2). In some embodiments, the power fail signal is received from the host system (e.g., computer system 110, FIG. 1A). In some embodiments, the power fail signal is generated by a supervisory module (e.g., supervisory module 126, FIG. 1A) in accordance with a determination that a power supply voltage meets predetermined power fail criteria. In some embodiments, the power fail signal is generated by a supervisory module (e.g., supervisory module 126, FIG. 2) in response to the supervisory module or a component thereof (e.g., PCP 202) detecting a power fail event.

In some embodiments, supplying power, via the one or more energy storage devices, to the one or more memory group modules includes (914), for each energy storage device of the one or more energy storage devices, switching the output of the respective energy storage device from an output of a boost regulator to an input of the boost regulator. In some embodiments, the storage device switches the output of the respective energy storage device in response to receiving a power fail signal. For example, in accordance with some embodiments, selector 416 in FIG. 4B switches the output of energy storage device 402 from the output of boost regulator 414 to the input of boost regulator 414 during a power fail operation. In some embodiments, the energy storage device is switched as soon as the power fail event is detected. In some embodiments, however, the energy storage device is switched (from the output of boost regulator 414 to the input of boost regulator 414) when, or in accordance with a determination that, the voltage supplied by the energy storage device (e.g., $V_{Storage}$ 420, FIG. 4B) falls below a predetermined threshold.

For example, in accordance with some embodiments, a power fail event includes, at a first time, a drop in a voltage supplied by a host system (e.g., computer system 110, FIG. 1A) and a drop in a voltage generated by a regulator module (e.g., regulator module 204, FIG. 2) based on the voltage supplied by the host system. The power failure is detected (e.g., by PCP 202) and, at second time, an energy storage module (e.g., energy storage module 332) is coupled to the input of a corresponding boost regulator (e.g., boost regulator 414, FIG. 4B). In some embodiments, the PCP detects the power failure and signals a load switch (e.g., load switch 404, FIG. 4B) via a communication line (e.g., communication line 230, FIG. 2) to decouple the energy storage module from the regulator module. In some embodiments, the PCP also signals a selector (e.g., selector 416) via a communication line (e.g., communication line 230, FIG. 2) to couple the energy storage device to the input of the boost regulator.

The power fail operation also includes supplying (916) power, via an additional energy storage device, to a storage device controller, the storage device controller corresponding to the first section of the storage device. For example, FIG. 1A shows energy storage module 124 coupled to storage device controller 128 and, in accordance with some embodiments, energy storage module 124 supplies power to storage device controller 128 during a power fail operation.

The additional energy storage device is distinct (918) from the one or more energy storage devices. For example, FIG. 1A shows energy storage module 124 (coupled to storage device controller 128) distinct from energy storage modules 132 (coupled to memory group modules 130).

The one or more energy storage devices and the additional energy storage device are each distinct (920) from a power source used during normal operation of the storage device. For example, in accordance with some embodiments, $V_{dd}$ 210 in FIG. 2 is a power source used during normal operation of storage device 120. In this example, the energy storage module shown in FIG. 1A (e.g., energy storage module 124 and energy storage modules 132) are used during a power fail operation and are each distinct from $V_{dd}$ 210.

As used herein, "normal" operation, also sometimes called "standard" operation, is a mode of operation of the storage device in which the storage system is being used for its intended purposes (e.g., to read and write data) by a host system (e.g., computer system 110, FIG. 1A). For example, in normal operation, the storage device is receiving and responding to commands sent from a host system. Normal operation is distinguished from a power fail operation where the storage device is hardening data and/or resetting controllers rather than receiving and responding to commands sent from a host system.

Normal operation is also distinguished from manufacturing of the storage device, which is completed prior to the storage device being coupled to a host system, and testing of the storage device (sometimes called a testing mode of operation), which is either done: (1) while coupled to a testing system; (2) prior to being coupled to a host system; and/or (3) is done in a manner that prevents the storage device from being used for its intended purposes during the testing process. For example, failure detection optionally occurs in a storage device during manufacturing, testing, and/or normal operation. In some embodiments, failure detection during the manufacturing process includes detecting that the storage device (and/or individual components therein) do not meet manufacturing parameters (e.g., one or more characteristics of the device are outside of predetermined acceptable boundaries). In some embodiments, failure detection during a testing process includes testing the operability of a plurality of distinct portions on the storage device (e.g., systematically testing each portion of the storage device in a controlled manner). In some embodiments, the testing process includes more controlled parameters (e.g., controlled parameters specified by the testing protocol) than normal operation. For example, during the testing process, write commands optionally involve known predetermined data to be written to each portion, whereas during normal operation, the data is variable and is based in part on the operation of the host system. In some embodiments, manufacturing and testing are a combined process where testing is performed at various stages of the manufacturing.

In some embodiments, the one or more memory group modules include (922) at least first and second memory group modules, and the one or more energy storage devices include at least first and second energy storage devices. For example, FIG. 1A shows energy storage modules 132 including energy storage module 132-1 and energy storage module 132-m. FIG. 1A also shows memory group modules 130 including memory group module 130-1 and memory group module 130-m.

In some embodiments, supplying power, via the one or more energy storage devices, to the one or more memory group modules includes (924): (1) utilizing the first energy storage device to supply power to the first memory group module, and not utilizing the first energy storage device to supply power to the second memory group module; and (2) utilizing the second energy storage device to supply power to the second memory group module, and not utilizing the second energy storage device to supply power to the first memory group module. In addition, neither the first energy storage device nor the second energy storage device provides power to the storage device controller (e.g., storage device controller 128, FIG. 1A) of the storage device during power fail operations. For example, in accordance with some embodiments, energy storage module 132-1 in FIG.

1A supplies power to memory group module 130-1 and does not supply power to memory group module **130-*m*. In this example, energy storage module 132-*m* supplies power to memory group module 130-*m* and does not supply power to memory group module 130-1**. In some embodiments, (1) the first energy storage device is coupled to the first memory group module, and is not coupled to the second memory group module; and (2) the second energy storage device is coupled to the second memory group module, and is not coupled to the first memory group module. In addition, neither the first energy storage device nor the second energy storage device coupled to the storage device controller during power fail operations.

In some embodiments, the one or more memory group modules include (926) at least a first memory group module and a second memory group module. For example, FIG. 1B shows memory group modules 162 and memory group module 168.

In some embodiments, supplying power, via the one or more energy storage devices, to the one or more memory group modules includes (928) supplying power to the first memory group module and not supplying power to the second memory group module. In some embodiments, the second memory group module does not harden data during a power fail operation. For example, in accordance with some embodiments, energy storage module 164 in FIG. 1B supplies power to memory group modules 162 and does not supply power to memory group module 168. In some embodiments, the one or more energy storage devices are coupled to the first memory group module and not coupled to the second memory group module.

In some embodiments, the storage device prevents (930) the storage of critical data in memory corresponding to the second memory group module. For example, in accordance with some embodiments, storage device 160 in FIG. 1B prevents the storage of critical data within memory group module 168. In some embodiments, the storage device stores critical data in the first memory group module, wherein the first memory group module is coupled to the one or more energy storage devices. In some embodiments, the storage device: (1) initially stores critical data in the first memory group module; (2) copies the data to the second memory group module; then (3) discards (e.g., erases/overwrites) the data in the first memory group module.

In some embodiments, the one or more energy storage devices consist (932) of a first energy storage device, and the one or more memory group modules comprise a plurality of memory group modules. For example, FIG. 1B shows energy storage device 164 and memory group modules 162.

In some embodiments, supplying power, via the one or more energy storage devices, to the one or more memory group modules includes (934) supplying power, via the first energy storage device, to the plurality of memory group modules. For example, in accordance with some embodiments, energy storage module 164 supplies power to memory group modules 162 (e.g., memory group module 162-1 through memory group module **162-*n***).

In some embodiments, the power fail operation further includes (936) hardening data. As used herein, data hardening is the process of saving data to non-volatile memory. The data optionally includes mission critical data and/or metadata. In some embodiments, the storage device (e.g., storage device 120, FIG. 1A) includes volatile memory and non-volatile memory, and data hardening includes transferring data from the volatile memory to the non-volatile memory. In some embodiments, the storage device includes volatile memory corresponding to a first controller (e.g., memory group module controller 310, FIG. 3) and the first controller performs data hardening by transferring data from volatile memory 304 to non-volatile memory (e.g., non-volatile memory 306-1). For example, in some embodiments, the first section of the storage device corresponds to a plurality of controllers, each controller of the plurality of controllers having associated volatile memory. In this example, performing data hardening on the first section of the storage device includes transferring data from the associated volatile memories to non-volatile memory. In some embodiments, each respective memory group module controller is further configured to harden data during a power fail operation. For example, in accordance with some embodiments, memory group module controller 310 is configured to harden data during a power fail operation.

In some embodiments, hardening data includes (938), for a respective memory group module, transferring data from volatile memory to non-volatile memory within the respective memory group module. In some embodiments, each memory group module has associated volatile memory. For example, in accordance with some embodiments, hardening data includes transferring data from volatile memory 304 in FIG. 3 to one or more non-volatile memories 306. In some embodiments, hardening data further includes programming the data to the non-volatile memory (e.g., non-volatile memories 306, FIG. 3).

In some embodiments, non-volatile memory is divided into a number of addressable and individually selectable blocks. In some embodiments, the individually selectable blocks are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device. Furthermore, one block comprises any number of pages, for example, 64 pages, 128 pages, 256 pages or another suitable number of pages. Blocks are typically grouped into a plurality of planes and/or zones. Each block plane or zone can be independently managed to some extent, which increases the degree of parallelism for parallel operations and simplifies management of the non-volatile memory.

In some embodiments, the data is transferred to one or more predetermined pages within the non-volatile memory. In some embodiments, the non-volatile memory includes a plurality of fast pages and a plurality of slow pages and the one or more predetermined pages are a subset of the plurality of fast pages (e.g., a fast page comprising single-level cells). In some embodiments, using fast pages to transfer data is at least three times faster than using slow pages. In some embodiments, the data is transferred to one or more predetermined blocks within the non-volatile memory. In some embodiments, the non-volatile memory includes a plurality of fast blocks and a plurality of slow blocks and the one or more predetermined blocks are a subset of the plurality of fast blocks. In some embodiments, the non-volatile memory includes a plurality of multi-level cells and the non-volatile memory has two block types: (1) a fast block (sometimes called lower block), and (2) a slow block (sometimes called an upper block). In some embodiments, using fast blocks to transfer data is at least three times faster than using slow blocks.

In some embodiments, the power fail operation further includes (940), for each memory group module of the one or more memory group modules, subsequent to hardening the data, resetting the respective memory group module controller. For example, in some embodiments, resetting the respective memory group module controller includes setting the memory group module to a known state and affirmatively removing power from (as opposed to allowing the module to automatically lose power) the respective memory group module controller. In some embodiments, each memory group module of the one or more memory group modules resets independently of any other memory group module. In some embodiments, each memory group module of the one or more memory group modules resets after the storage device controller is reset and after hardening the data (if any) sent to it for hardening.

In some embodiments, the power fail operation further includes (942) resetting the storage device controller, and/or removing power from the storage device controller, prior to completion of the power fail operation. In some embodiments, this includes resetting the storage device controller when transferring data from volatile memory associated with the storage device controller to at least one memory group module is completed, and then affirmatively removing power from the storage device controller prior to completion of the power, where both the resetting and the removal of power from the storage device controller occur prior to the at least one memory group module storing the transferred data to non-volatile memory. For example, in some embodiments, resetting the storage device controller includes setting the storage device controller to a known state and affirmatively removing power from the storage device controller (as opposed to allowing the controller to automatically lose power). In some embodiments, the known state is a high impedance output state (e.g., the storage device controller is a tri-state controller). In some embodiments, the storage device controller is reset using power supplied by the additional energy storage device.

In some embodiments, the storage device controller (e.g., storage device controller 128, FIG. 1A) signals to a supervisory module (e.g., supervisory module 126, FIG. 1A) when it has completed transferring data to the memory group modules (e.g., memory group modules 130, FIG. 1A). When the supervisory module receives this signal (e.g., a data hardening done signal), it can then reset the storage device controller. In some embodiments, resetting the storage device controller puts the storage device controller in a predefined low power state. In some embodiments, resetting the memory controller is controlled by a supervisory module and the reset functionality is disabled while data is being transferred to non-volatile memory (e.g., the supervisory module prevents the storage device controller from being reset when the storage device controller is transferring data held in volatile memory to the memory group modules). In some implementations, a reset module in the supervisory module (e.g., a reset module stored in memory in PCP 202), in conjunction with a reset module in the storage device controller (e.g., reset module 630, FIG. 6), is used to reset the storage device controller subsequent to transferring data from the storage device controller to the memory group modules.

In some embodiments, prior to resetting the storage device controller, the storage device transfers (944) data from volatile memory associated with the storage device controller to at least one memory group module of the one or more memory group modules. For example, in accordance with some embodiments, storage device controller 128 transfers volatile data 618 (FIG. 6) from memory 606 to at least one memory group module (e.g., memory group module 130-1, FIG. 1A) of the one or more memory group modules.

In some embodiments, resetting the storage device controller includes (946) resetting the storage device controller regardless of whether data is stored in volatile memory associated with the storage device controller. For example, in accordance with some embodiments, storage device controller 128 resets regardless of the presence of volatile data 618 (FIG. 6) in memory 606. In some embodiments, the data stored in the volatile memory is not transferred to non-volatile memory prior to resetting the controller. For example, in some instances, the data stored in the volatile memory associated with the storage device controller is lost during the power fail operation. Furthermore, in some embodiments, non-critical data stored in the volatile memory associated with the storage device controller is not transferred to non-volatile memory prior to resetting the storage device controller.

In some embodiments, the power fail operation further includes (950) ceasing to supply power, via a regulator module, to the one or more memory group modules. For example, in some embodiments, ceasing to supply power to the one or more memory group modules includes ceasing to supply power to the one or more memory group modules in response to a power fail signal. In some embodiments, the storage device further comprises a switch (e.g., a PFET) and the switch decouples the regulator module from the one or more memory group modules. For example, in accordance with some embodiments, switch 404 in FIG. 4A decouples supervisory module 126 (including regulator module 204, FIG. 2) from memory group module 300.

In some embodiments, the power fail operation further includes (952) preventing corruption of previously committed data by committing (e.g., writing and/or programming) data stored in volatile memory corresponding to a particular memory group module of the one or more memory group modules, regardless of errors in the data. In some embodiments, the non-volatile memory includes a plurality of multi-level cells and data is stored in each level of a particular multi-level cell. In some instances, aborting the storage of data in a particular level of a multi-level cell will corrupt the data stored in the other levels of the multi-level cell. To avoid such data corruption, in some embodiments the storage device, during a power fail operation, stores data only to lower pages, which have lower bit error rates (BER) than upper pages. In effect, during a power fail operation, data is written only to cells configured for use as single level cells (SLCs). In addition, error correction codes are calculated and stored with the data, thereby protecting against data corruption. Optionally, and XOR parity is computed and stored for the data written during a power fail operation, further protecting against data corruption.

In some embodiments, the storage device determines that one or more errors are present in a particular dataset and the memory group module commits the particular dataset to non-volatile memory without correcting the one or more errors. In some embodiments, during normal operation, the storage device, prior to committing a particular dataset to non-volatile memory: (1) determines whether one or more errors are present in the particular dataset; (2) in accordance with a determination that one or more errors are present in the particular dataset, the storage device corrects at least a subset of the one or more errors; and (3) after correcting at least the at least a subset of the one or more errors, the storage device commits the particular dataset to non-volatile memory. In these embodiments, during a power fail operation, the storage device commits a particular dataset to non-volatile memory without determining whether one or more errors are present in the particular dataset.

In some embodiments, data is stored (954) in the volatile memory associated with the storage device controller and the data comprises metadata corresponding to a mapping of non-volatile memory in the one or more memory group modules. For example, FIG. 6 shows memory 606 containing metadata 620 and, in accordance with some embodiments, metadata 620, or optionally a portion of metadata 620, corresponds to a mapping of non-volatile memory. In some embodiments, the mapping is a logical to physical address mapping. In some embodiments, the mapping is a mapping of known-bad sectors.

In some embodiments, subsequent to the power fail operation, the storage device reconstructs (956) the metadata corresponding to the mapping of non-volatile memory in the one or more memory group modules from metadata stored in respective non-volatile memory of at least one memory group module of the one or more memory group modules. In some embodiments, the storage device is configured to reconstruct the metadata during a start-up operation subsequent to the power fail operation. For example, in accordance with some embodiments, storage device controller 128 (FIG. 1A) reconstructs metadata 620 (FIG. 6) by accessing metadata stored in non-volatile memory (e.g., non-volatile memory 306-1, FIG. 3) within memory group modules 130 (FIG. 1A).

In some embodiments, the storage device disregards (958) one or more signals sent from the storage device controller to the one or more memory group modules during the power fail operation. For example, in some embodiments, each memory group module is configured to ignore erroneous outputs (e.g., glitches) generated by the storage device controller during the process of powering down and/or after powering down. For example, in accordance with some embodiments, during a power fail operation, memory group module 130-1 in FIG. 1A disregards one or more signals received from storage device controller 128 via line 142-1.

In some embodiments, the storage device receives (960) data from the host system (e.g., via host interface 122) to be written to non-volatile memory. In some embodiments, the receiving is performed at the storage device controller. For example, in accordance with some embodiments, storage device controller 128 in FIG. 1A receives data from computer system 110 via host interface 122 and line 123.

In some embodiments, the storage device transfers (962) the data to at least one memory group module of the one or more memory group modules. For example, in some embodiments, the storage device is configured to transfer the data to volatile memory (e.g., a buffer) within the memory group. For example, in accordance with some embodiments, storage device controller 128 in FIG. 3 transfers the data to volatile memory 304 within memory group module 300.

In some embodiments, after transferring the data to the at least one memory group module, the storage device sends (964) an acknowledgement signal to the host, where the acknowledgement signal indicates to the host system that the data has been stored in non-volatile memory. In some embodiments, sending is performed at the storage device controller. For example, in accordance with some embodiments, storage device controller 128 in FIG. 1A sends an acknowledgement signal to computer system 110 via line 123 and host interface 122.

In some embodiments, during normal operation, the storage device supplies (966) power, via a regulator module, to the one or more memory group modules. In some embodiments, the storage device also charges, via the regulator module, each energy storage device of the one or more energy storage devices during normal operation. For example, in accordance with some embodiments, regulator module 204 in FIG. 2 supplies power to memory group modules 130 via lines 226 and energy storage modules 132. In accordance with some embodiments, regulator module 204 in FIG. 2 charges a respective energy storage device within each energy storage module of energy storage modules 132 via a corresponding line of lines 226.

In some embodiments, the storage device utilizes (968) the one or more energy storage devices to buffer power spikes in power received from the regulator module (e.g., bulk decoupling). In some embodiments, in addition to utilizing the one or more energy storage devices to supply power during a power fail operation, the storage device utilizes the one or more energy storage devices to buffer power spikes in power received during normal operation of the storage device. In some embodiments, the one or more energy storage devices buffer are configured to operate as bulk decoupling devices during normal operation of the storage device. For example, in accordance with some embodiments, energy storage module 164 in FIG. 1B is configured to operate in a similar manner as decoupling device 180 to buffer power spikes in power received from supervisory module 126 (e.g., regulator module 204, FIG. 2).

In some embodiments, supplying power, via the regulator module, to the one or more memory group modules includes (970) supplying power corresponding to a plurality of voltages, including a first voltage, to each memory group module of the one or more memory group modules. For example, in accordance with some embodiments, regulator module 800 in FIG. 8 generates a plurality of voltages (e.g., $V_{O1}$ through $V_{O5}$) and supplies the plurality of voltages to each memory group module of memory group modules 130 (FIG. 1A).

In some embodiments, supplying power, via the one or more energy storage devices, to the one or more memory group modules includes (972) supplying power corresponding to only the first voltage to each memory group module of the one or more memory group modules. For example, in some embodiments, (1) the regulator module (e.g., regulator module 800, FIG. 8) includes a plurality of outputs, each output corresponding to a particular voltage of the plurality of voltages; and (2) the power supplied by the one or more energy storage devices replaces the power supplied by a first output of the plurality of the regulator module outputs during a power fail operation, where the first output corresponds to the first voltage (e.g., $V_{O5}$ 822, FIG. 8). In some embodiments, only the first voltage is required to perform data hardening (e.g., during a power fail operation).

FIGS. 10A-10B are diagrams illustrating the energy savings achieved by utilizing a distributed holdup device. FIG. 10A is a diagram illustrating power usage of a non-distributed holdup device during a power fail operation. FIG. 10A shows control energy 1002 representing the energy required to power various control modules (e.g., a supervisory module and/or a storage device controller) on a non-distributed holdup storage device. FIG. 10A also shows transfer energy 1004 representing the energy required to transfer data from volatile memory on the storage device to non-volatile memory on the storage device. FIG. 10A further shows NVM program energy 1006 representing the energy required to program the transferred data into non-volatile memory.

FIG. 10B is a diagram illustrating power usage of a distributed holdup device during a power fail operation. FIG. 10B shows control energy 1010 representing the energy required to power various control modules (e.g., supervisory module 126 and/or storage device controller 128, FIG. 1A) on a distributed holdup storage device (e.g., storage device 120, FIG. 1A). FIG. 10B also shows control transfer energy 1012 representing the energy required to transfer data from volatile memory associated with one or more of the control modules (e.g., storage device controller 128) to one or more memory group modules (e.g., memory group modules 130, FIG. 1A) on the storage device and memory group module transfer energy 1014 representing the energy required to transfer data from volatile memory associated with the memory group modules to non-volatile memory within the memory group modules (e.g., transfer data from volatile memory 304 to non-volatile memories 306, FIG. 3). FIG. 10B further shows memory group module program energy 1016 representing the energy required to program the transferred data into non-volatile memory within each memory group module.

As a non-limiting example, in some instances, a power fail operation in a non-distributed holdup device requires approximately twice the energy required by a power fail operation in a distributed holdup device. In this example, the control modules in the non-distributed holdup device consume approximately 3.66 watts of power and the control modules are powered for approximately 15 milliseconds. Thus control energy 1002 is approximately 55 millijoules. Transferring data in the non-distributed holdup device during a power fail operation consumes approximately 2 watts of power and the transferring takes approximately 10 milliseconds. Thus transfer energy 1004 is approximately 20 millijoules. Programming the transferred data to non-volatile memory in the non-distributed holdup device during a power fail operation consumes approximately 3 watts of power and the programming takes approximately 12 milliseconds. Thus NVM program energy 1006 is 36 millijoules. Therefore, in this example, the non-distributed holdup device requires approximately 111 millijoules of energy to perform the power fail operation.

Conversely, in this example, the control modules in the distributed holdup device consume 3.66 watts of power and the control modules are powered for 3 milliseconds. Thus control energy 1010 is approximately 11 millijoules. Transferring data from volatile memory associated with the control modules to the memory group modules in the distributed holdup device during a power fail operation consumes 2 watts of power and the transferring takes 1 millisecond. Thus control transfer energy 1012 is 2 millijoules. Transferring data from volatile memory associated with the memory group modules to non-volatile memory within the memory group modules in the distributed holdup device during a power fail operation consumes approximately 1 watt of power and the transferring takes approximately 10 milliseconds. Thus memory group module transfer energy 1014 is approximately 10 millijoules. Programming the transferred data to non-volatile memory within the memory group modules in the distributed holdup device during a power fail operation consumes approximately 3 watts of power and the programming takes approximately 12 milliseconds. Thus memory group module program energy 1016 is approximately 36 millijoules. Therefore, in this example, the distributed holdup device requires approximately 59 millijoules of energy to perform the power fail operation, which is approximately half the energy required to perform the power fail operation in the non-distributed holdup device. Finally, in this example, to provide a margin of safety and to account for changes in energy consumption by these power fail operations as the storage device ages, energy storage devices having approximately 72 to 85 millijoules of energy are provided in accordance with a computed energy requirement of 59 millijoules, thereby providing a 20% to 40% safety margin.

In some embodiments, the storage device comprises one or more three-dimensional (3D) memory devices and circuitry associated with operation of memory elements in the one or more 3D memory devices.

In some embodiments, the circuitry and one or more memory elements in a respective 3D memory device, of the one or more 3D memory devices, are on the same substrate.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible (e.g., a NOR memory array). NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration (e.g., in an x-z plane), resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device level. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

The term "three-dimensional memory device" (or 3D memory device) is herein defined to mean a memory device having multiple memory layers or multiple levels (e.g., sometimes called multiple memory device levels) of memory elements, including any of the following: a memory device having a monolithic or non-monolithic 3D memory array, some non-limiting examples of which are described above; or two or more 2D and/or 3D memory devices, packaged together to form a stacked-chip memory device, some non-limiting examples of which are described above.

One of skill in the art will recognize that this invention is not limited to the two dimensional and three dimensional exemplary structures described but cover all relevant memory structures within the spirit and scope of the invention as described herein and as understood by one of skill in the art.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A solid-state drive, comprising:
an interface for coupling the solid-state drive to a host system;
one or more memory group modules, each memory group module of the one or more memory group modules including a respective memory controller and non-volatile memory, wherein each respective memory controller is configured to control a plurality of operations within a corresponding memory group module;
a storage device controller coupled to the one or more memory group modules, the storage device controller configured to control a plurality of data transfer operations; and
one or more energy storage devices, each of the one or more energy storage devices for supplying power to one or more corresponding memory group modules during a power fail operation;
wherein the solid-state drive is configured to couple each energy storage device of the one or more energy storage devices to one or more corresponding memory group modules without coupling the energy storage device to the storage device controller during the power fail operation.

2. The solid-state drive of claim 1, wherein at least one memory group module of the one or more memory group modules is configured to harden data during the power fail operation.

3. The solid-state drive of claim 1, further comprising volatile memory corresponding to each memory group module of the one or more memory group modules;
wherein hardening data comprises, for a respective memory group module, transferring data to the non-volatile memory within the respective memory group module from the corresponding volatile memory.

4. The solid-state drive of claim 1, wherein the at least one memory group module is further configured to reset subsequent to hardening the data.

5. The solid-state drive of claim 1, wherein each memory group module of the one or more memory group modules is configured to disregard signals received from the storage device controller during the power fail operation.

6. The solid-state drive of claim 1, wherein the one or more memory group modules include at least first and second memory group modules, the one or more energy storage devices include at least first and second energy storage devices, and the solid-state drive is configured to couple the first energy storage device to the first memory group module but not the second memory group module, and is further configured to couple the second energy storage device to the second memory group module but not the first memory group module.

7. The solid-state drive of claim 1, wherein the one or more energy storage devices consist of a first energy storage device, and the one or more memory group modules comprise a plurality of memory group modules; and
the first energy storage device is coupled to each memory group module of the plurality of memory group modules.

8. The solid-state drive of claim 1, wherein the one or more memory group modules comprise a plurality of memory group modules; and
wherein a first subset of the plurality of memory group modules are not coupled to the one or more energy storage devices.

9. The solid-state drive of claim 8, wherein the solid-state drive is configured to prevent the storage of critical data in memory corresponding to the first subset of the plurality of memory group modules.

10. The solid-state drive of claim 1, wherein the storage device controller is configured to:
receive data from the host system to be written to non-volatile memory;
transfer the data to at least one memory group module of the one or more memory group modules; and
after transferring the data to the at least one memory group module, send an acknowledgement signal to the host, wherein the acknowledgement signal indicates to the host system that the data has been stored in non-volatile memory.

11. The solid-state drive of claim 1, wherein the solid-state drive further comprises an additional energy storage device coupled to the storage device controller, the additional energy storage device configured to supply power to the storage device controller during the power fail operation, wherein the additional energy storage device is distinct from the one or more energy storage devices.

12. The solid-state drive of claim 11, further comprising volatile memory associated with the storage device controller; and
wherein the solid-state drive is further configured to transfer data from the volatile memory associated with the storage device controller to at least one memory group module of the one or more memory group modules prior to resetting the storage device controller.

13. The solid-state drive of claim 11, further comprising volatile memory associated with the storage device controller;
wherein data is stored in the volatile memory associated with the storage device controller; and
wherein the solid-state drive is further configured to reset the storage device controller regardless of the data stored in the volatile memory associated with the storage device controller.

14. The solid-state drive of claim 13, wherein the data stored in the volatile memory associated with the storage device controller comprises metadata corresponding to a mapping of non-volatile memory in the one or more memory group modules; and
wherein the solid-state drive is further configured to reconstruct the metadata corresponding to the mapping of non-volatile memory in the one or more memory group modules from metadata stored in non-volatile memory of at least one memory group module of the one or more memory group modules subsequent to the power fail operation.

15. The solid-state drive of claim 1, wherein the solid-state drive is configured to reset the storage device controller during the power fail operation.

16. The solid-state drive of claim 1, wherein the solid-state drive is configured to:
   determine whether a power supply voltage provided to the solid-state drive meets predetermined power fail criteria; and
   in accordance with a determination that the power supply voltage meets the predetermined power fail criteria, perform the power fail operation.

17. The solid-state drive of claim 1, further comprising:
   one or more boost regulators, each boost regulator of the one or more boost regulators configured to boost a respective input voltage and having an output coupled to at least one memory group module of the one or more memory group modules; and
   one or more selectors, each selector of the one or more selectors configured to selectively couple a respective energy storage device to either an input or an output of a corresponding boost regulator;
      wherein a respective selector is configured to couple a respective energy storage device to the output of a corresponding boost regulator during normal operation of the solid-state drive; and
      wherein the selector is further configured to couple the respective energy storage device to the input of the corresponding boost regulator during the power fail operation.

18. The solid-state drive of claim 1, further comprising a regulator module coupled to the interface, the regulator module comprising one or more regulators for supplying power to a first portion of the solid-state drive, wherein the first portion includes at least the one or more memory group modules;
   wherein each of the one or more energy storage devices is further coupled to a respective output of the regulator module.

19. The solid-state drive of claim 18, wherein each energy storage device of the one or more energy storage devices is further configured to buffer power spikes in power received from the respective output of the regulator module.

20. The solid-state drive of claim 18, wherein the solid-state drive is further configured to decouple the regulator module from at least one energy storage device of the one or more energy storage devices during the power fail operation.

21. The solid-state drive of claim 18, wherein:
   a first memory group module of the one or more memory group modules is coupled to a plurality of regulator module outputs, wherein each output of the plurality of regulator module outputs corresponds to a particular voltage; and
   a first respective energy storage device is coupled to the first memory group module and a first output of the plurality of the regulator module outputs;
   the regulator module is configured to supply power corresponding to a first voltage via the first output of the plurality of the regulator module outputs during normal operation;
   the solid-state drive is configured to decouple the plurality of regulator module outputs from the first memory group module during the power fail operation; and
   the first respective energy storage device is configured to supply power corresponding to the first voltage to the first memory group module during the power fail operation.

22. The solid-state drive of claim 1, wherein
   a first memory group module of the one or more memory group modules is configured to prevent corruption of previously committed data by committing data stored in volatile memory corresponding to a particular memory group module of the one or more memory group modules during the power fail operation, regardless of errors in the data.

23. A method of protecting data in a solid-state drive comprising volatile memory and non-volatile memory, the method comprising:
   performing a power fail operation on a first section of the solid-state drive, the first section of the solid-state drive comprising one or more memory group modules, and the power fail operation including:
      supplying power, via one or more energy storage devices, to the one or more memory group modules, wherein each memory group module of the one or more memory group modules includes a respective memory group module controller; and
      supplying power, via an additional energy storage device, to a storage device controller, the storage device controller corresponding to the first section of the solid-state drive;
         wherein the additional energy storage device is distinct from the one or more energy storage devices; and
         wherein the one or more energy storage devices and the additional energy storage device are each distinct from a power source used during normal operation of the solid-state drive.

24. A non-transitory computer readable storage medium, storing one or more programs for execution by one or more processors of a solid-state drive, the one or more programs including instructions for:
   performing a power fail operation on a first section of the solid-state drive, the first section of the solid-state drive comprising one or more memory group modules, and the power fail operation including:
      supplying power, via one or more energy storage devices, to the one or more memory group modules, wherein each memory group module of the one or more memory group modules includes a respective memory group module controller; and
      supplying power, via an additional energy storage device, to a storage device controller, the storage device controller corresponding to the first section of the solid-state drive;
   wherein the additional energy storage device is distinct from the one or more energy storage devices; and
   wherein the one or more energy storage devices and the additional energy storage device are each distinct from a power source used during normal operation of the solid-state drive.

* * * * *